(12) United States Patent
Okazaki et al.

(10) Patent No.: US 7,570,555 B2
(45) Date of Patent: Aug. 4, 2009

(54) DIGITAL DATA DEMODULATOR

(75) Inventors: Makoto Okazaki, Niihama (JP);
Yasushi Ueda, Saijo (JP)

(73) Assignee: Panasonic Corporation, Osaka (JP)

( * ) Notice: Subject to any disclaimer, the term of this patent is extended or adjusted under 35 U.S.C. 154(b) by 730 days.

(21) Appl. No.: 11/022,818

(22) Filed: Dec. 28, 2004

(65) Prior Publication Data
US 2005/0152461 A1 Jul. 14, 2005

(30) Foreign Application Priority Data
Jan. 9, 2004 (JP) ............................ 2004-003550

(51) Int. Cl.
*G11B 20/12* (2006.01)
*G11B 20/10* (2006.01)
(52) U.S. Cl. .............. 369/47.19; 369/59.19; 369/47.35; 369/53.31; 369/53.35; 369/47.22
(58) Field of Classification Search .............. 369/47.19, 369/47.35, 53.31, 53.32; 370/216; 341/94; 375/259
See application file for complete search history.

(56) References Cited

U.S. PATENT DOCUMENTS 4,949,325 A * 8/1990 Tsuyoshi et al. .......... 369/47.19

2002/0024904 A1 * 2/2002 Kobayashi et al. ......... 369/52.1

FOREIGN PATENT DOCUMENTS

| JP | 7-244935    | 9/1995 |
| JP | 2000-242929 | 9/2000 |
| JP | 2003-109302 | 4/2003 |
| JP | 2003-272307 | 9/2003 |

* cited by examiner

*Primary Examiner*—Wayne R Young
*Assistant Examiner*—Dionne H Pendleton
(74) *Attorney, Agent, or Firm*—Steptoe & Johnson LLP

(57) ABSTRACT

A digital data demodulator which can reduce a loss of decodable digital data, and increase capability of reproducing digital data inputted through a transmission line even when an error occurs in the transmission line. In the digital data demodulator, a specific pattern detector (113) detects a specific pattern to be included in a modulation code, from a bit string inputted through a transmission line (104). A modulation code identifying unit (117) generates a demodulation data strobe signal (119) according to a phase of the modulation code including the specific pattern. An error corrector (121) samples demodulation data (109) in response to the demodulation data strobe signal (119) and reproduces the data to the original digital data.

10 Claims, 9 Drawing Sheets

DIGITAL DATA DEMODULATOR

FIELD OF THE INVENTION

The present invention relates to a digital data modulator for outputting digital data to a transmission line, a digital data demodulator for demodulating modulated digital data which is inputted through the transmission line, and a digital data modulator-demodulator.

BACKGROUND OF THE INVENTION

The following will describe conventional digital data demodulators and digital data modulators by taking conventional digital data modulator-demodulators as an example. The conventional digital data modulator-demodulators are used for Compact Disc (CD) recorders/players.

In conventional CD recorders/players (conventional digital data modulator-demodulators), when information to be recorded is recorded on a CD, additional information such as an error-correcting code and a data attribute is first added to first digital data, which is information to be recorded on the CD, to constitute second digital data. Subsequently, Eight to Fourteen Modulation (EFM) is performed on the second digital data to constitute third digital data satisfying RLL [2, 10] (abbreviation of Run Length Limited, the minimum run length is 2 and the maximum run length is 10). Further, a synchronous pattern is disposed at the front of modulation data for each predetermined number of modulation data, and a 3-bit merge bit is added to the front of a synchronous pattern and the front of the modulation data.

EFM is processing for converting an 8-bit length data symbol, which constitutes the second digital data, into modulation data of 14 bits.

A data block configured thus is referred to as a frame (modulation data block), in which the synchronous pattern is disposed at the front of modulation data for each predetermined number of modulation data and a merge bit string is disposed at the front of the synchronous pattern and the front of the modulation data.

Thereafter, NRZi (Non Return to Zero Inverted) conversion is performed on the third digital data to enable pit formation according to a run length. Then, pits and space are formed on the data recording surface of the CD according to data obtained after the NRZi conversion.

As described above, in the conventional CD recorder/players (conventional digital data modulator-demodulators), the first digital data is recorded on the CD by forming pits on the CD.

For example, Japanese Patent Laid-Open No. 2000-242929 discloses a digital data modulator-demodulator, in which when additional information different from first digital data is recorded on a CD, the additional information is converted into a deviation from the track center, and a pit is formed on the CD according to the deviation (See Japanese Patent Laid-Open No. 2000-242929, pp. 7-8, 11-12, FIGS. 2 and 8).

As described in Japanese Patent Laid-Open No. 2000-242929, the conventional recording method is also applicable to a digital versatile disc (DVD) (See Japanese Patent Laid-Open No. 2000-242929, pp. 11-12).

For example, as described in Japanese Patent Laid-Open No. 2000-242929, in the conventional CD recorders/players (conventional digital data modulator-demodulators), when information recorded on a CD is reproduced, fourth digital data corresponding to third digital data after NRZi conversion is first reproduced from a pit formed on the CD. Subsequently, NRZ conversion is performed on the fourth digital data to reproduce fifth digital data corresponding to the third digital data. Then, EFM demodulation is performed on the fifth digital data to reproduce sixth digital data corresponding to the second digital data. After that, error correction is performed on the sixth digital data according to a synchronous pattern, so that the first digital data recorded on the CD is reproduced (See Japanese Patent Laid-Open No. 2000-242929, pp. 8-9, FIG. 3).

Moreover, for example, Japanese Patent Laid-Open No. 7-244935 discloses a conventional digital data modulator-demodulator which improves the detection and protection of a synchronous pattern included in fifth digital data in order to improve the capability of reproducing sixth digital data (See Japanese Patent Laid-Open No. 7-244935, pp. 4-5, FIGS. 1, 2, 3).

However, in the conventional digital data demodulators, a modulation code (a data string obtained by adding a merge bit string of 3 channel bits to modulation data of 14 channel bits) cannot be specified in some states of an error occurring in a transmission line, and thus digital data which can be modulated may be lost before a synchronous pattern is specified.

Further, in pit formation defined as a transmission line (meaning recording on an optical disc), when additional information is recorded by forming a pit deviated from the recording track center of the optical disc, the following problem occurs: when a pit deviated from the recording track center is formed, reflected light for reading the pit is affected by a pit formed on an adjacent track and an uncorrectable error occurs in the transmission line. Thus, in the conventional digital data demodulators, digital data which can be modulated may be lost before the subsequent synchronous pattern is specified.

When the detection and protection of a synchronous pattern is improved, although a synchronous pattern is more likely to be specified, digital data which can be modulated may be lost before the synchronous pattern is specified.

DISCLOSURE OF THE INVENTION

In the present invention, a specific pattern is detected from a bit string inputted through a transmission line. When a phase difference is detected between a data string including the specific pattern with a second data length (e.g., a modulation code) and a currently demodulated data string of a second data length, demodulation is performed such that the data string of the second data length is identified on the basis of the data string including the specific pattern and is reproduced to original data until the subsequent synchronous pattern is detected. Further, the detection position of the synchronous pattern is corrected according to the phase difference. The present invention solves the problem in this manner and has as its object the provision of a digital data demodulator and a digital data modulator-demodulator which can reduce a loss of decodable digital data, and increase the capability of reproducing digital data inputted through a transmission line even when an error occurs in the transmission line.

Further, according to the present invention, during digital data modulation, a data string of a specific data length is replaced with a data string including a special code with the specific data length, on a specific position in a predetermined modulation data block (e.g., a frame after EFM). Then, during digital data demodulation, the special code is detected from the data string inputted through the transmission line, and the detected special code is analyzed to locate the special code. Until the subsequent synchronous pattern is detected, the data string of the second data length is identified on the basis of the data string including the special code. Moreover, the detection position of a synchronous pattern is corrected according to a phase difference between data strings of the second data length which are identified relative to the data string including the detected special code and the currently demodulated data string of the second data length. The arrangement of the identified data string of the second data length is corrected according to the position of the special code, and then demodulation is performed for reproduction to the original digital data. The present invention solves the problem in this manner and has as its object the provision of a digital data demodulator, a digital data modulator, and a digital data modulator-demodulator which can reduce a loss of decodable digital data, and increase the capability of reproducing digital data inputted through a transmission line even when an error occurs in the transmission line.

In order to attain the object, a first digital data demodulator of the present invention comprises: a synchronous pattern processing unit for detecting a synchronous pattern from a data string of a modulation data block on a predetermined detection position when the data string of the modulation data block is inputted through a transmission line, the modulation data block being configured such that digital data is converted into a modulation code of a second data length at each first data length and the synchronous pattern is disposed at the front of each of a predetermined number of modulation codes, a specific pattern detector for detecting a specific pattern from the data string of the modulation data block, a certainty decision unit for deciding that the data string including the specific pattern with the second data length is the modulation code when a phase difference is present between data strings of the second data length, the data strings being identified on the basis of the data string of the second data length including the specific pattern detected by the specific pattern detector and the synchronous pattern detected by the synchronous pattern processing unit, a modulation code identifying unit which identifies the modulation code of the modulation data block on the basis of the modulation code including the specific pattern, detects the phase difference, and corrects the detection position of the synchronous pattern in the synchronous pattern processing unit according to the phase difference, a demodulating unit for reproducing, to original digital data, the modulation code of the modulation data block identified by the modulation code identifying unit when the certainty decision unit decides that the data string of the second data length including the specific pattern is the modulation code.

According to the first digital data demodulator, a second digital data demodulator of the present invention, wherein the certainty decision unit detects a predetermined number of data strings of the second data length, the data strings being identified on the basis of the data string of the second data length including the specific pattern detected by the specific pattern detector, and the certainty decision unit detects the number of undecodable data strings from the predetermined number of data strings and decides that the data string of the second data length including the specific pattern detected by the specific pattern detector is the modulation code when the detected number is not larger than a threshold value indicating the certainty of the specific pattern. According to the second digital data demodulator, it is possible to confirm the reliability of the detected specific pattern, thereby preventing an erroneous detection of the specific pattern and identifying a reliable modulation code.

According to the second digital data demodulator, a third digital data demodulator of the present invention, wherein the threshold value indicating certainty is the maximum number of undecodable modulation codes which can be included in the predetermined number of modulation codes. According to the third digital data demodulator, the threshold value indicating certainty is, for example, the maximum number of error-correctable modulation codes. Thus, it is possible to increase the reliability of the detected specific pattern and identify a reliable modulation code.

According to the second digital data demodulator, a fourth digital data demodulator of the present invention, wherein the threshold value indicating certainty can be arbitrarily designated from the outside. According to the fourth digital data demodulator, it is possible to change the degree of reliability of the detected specific pattern and optimize the capability of demodulating digital data according to the state and kind of the transmission line.

According to the first digital data demodulator, a fifth digital data demodulator of the present invention, wherein the specific pattern detector comprises a pattern comparator for comparing the data string of the modulation data block and the bit string of the specific pattern, wherein when the pattern comparator detects data matching with the bit string of the specific pattern in the data string of the modulation data block, a signal indicating the detection of the specific pattern is outputted to the certainty decision unit.

According to the fifth digital data demodulator, a sixth digital data demodulator of the present invention, wherein the specific pattern is a bit string having the maximum run length in the modulation code or a combination of the modulation codes. The larger run length, the smaller number of modulation codes including the run length in a modulation scheme based on RLL. Therefore, when digital data is converted into a modulation code in a modulation scheme compliant with RLL, the specific pattern is a bit string having the maximum run length in the modulation code or a combination of the modulation codes in the sixth digital data demodulator, so that the specific pattern can be readily specified.

According to the fifth digital data demodulator, a seventh digital data demodulator of the present invention, wherein any data string can be externally designated as the specific pattern from the modulation code or a combination of the modulation codes. According to the seventh digital data demodulator, it is possible to designate, as a specific pattern, any characteristic data string included in the modulation code, thereby performing digital data demodulation according to the characteristic of the modulation data block.

According to the fifth digital data demodulator, an eighth digital data demodulator of the present invention, wherein the specific pattern has a data length which can be arbitrarily designated from the outside. According to the eighth digital data demodulator, it is possible to perform digital data demodulation according to the characteristic of the modulation data block.

According to the first digital data demodulator, a ninth digital data demodulator of the present invention, wherein the modulation code identifying unit identifies the modulation code selectively on the basis of the synchronous pattern detected by the synchronous pattern processing unit or the data string of the second data length including the specific pattern detected by the specific pattern detector. According to the ninth digital data demodulator, it is possible to switch methods of specifying a modulation code according to the state and kind of the transmission path, thereby optimizing digital data demodulation.

According to the first digital data demodulator, a tenth digital data demodulator of the present invention, wherein the transmission line is radiotelegraphy, wire telegraphy, or a recording medium.

According to the first digital data demodulator, an eleventh digital data demodulator of the present invention, wherein the demodulating unit comprises a demodulating unit for conversion into the digital data of the first data length for each modulation code of the second data length, and an error corrector for correcting an error of the digital data by using an error-correcting code added to the digital data beforehand, the digital data being outputted by the demodulating unit.

According to the first to eleventh digital data demodulators of the present invention, even when the transmission line has an error involving a bit slip, it is possible to specify the phase of the modulation code by detecting the specific pattern. Further, it is possible to correct the detection position of the synchronous pattern by detecting a phase difference between the data string of the second data length identified on the basis of the synchronous pattern and the data string of the second data length including the specific pattern. Therefore, it is possible to improve the capability of demodulating digital data. Since the detection position of the synchronous pattern can be corrected by means of information other than the synchronous pattern, it is possible to make corrections at many points, thereby improving the capability of detecting a synchronous pattern.

A first digital data modulator of the present invention comprises an error-correcting coder for adding an error-correcting code to digital data for each predetermined capacity to generate an error-correcting code data block, a modulating unit which adds a synchronous pattern to the front of the error-correcting code data block and converts the error-correcting code data block into a modulation code of a second data length for each first data length to generate a modulation data block, and a transmission digital data generating unit which replaces a data string of a specific data length on a specific position of the modulation data block, with a data string of the specific data length including a special code, generates a first transmission digital data block, and outputs the data block to a transmission line.

According to the first digital data modulator, a second digital data modulator of the present invention, wherein the special code is a data string equal to or longer than the data length of the modulation code. According to the second digital data modulator, the data length of a data string after modulation (second data length) is longer than the data length of the original data string (first data length). Thus, it is possible to obtain a data string which cannot be represented by the first data length in the modulation data block and convert the digital data into the modulation code compliant with a rule represented as RLL.

According to the first digital data modulator, a third digital data modulator of the present invention, wherein the special code includes a data string absent in the modulation code or a combination of the modulation codes. According to the third digital data modulator, a data string absent in the modulation code and a combination of the modulation codes can be used as the special code, and thus the special code can be readily detected during digital data demodulation.

According to the first digital data modulator, a fourth digital data modulator of the present invention, wherein any data string can be designated as the special code from the outside. According to the fourth digital data modulator, a data string absent in the modulation code and a combination of the modulation codes can be used as the special code, and thus the special code can be readily detected during digital data demodulation.

According to the first digital data modulator, a fifth digital data modulator of the present invention, wherein the special code includes information for specifying a position relative to the start of the first transmission digital data block.

According to the first digital data modulator, a sixth digital data modulator of the present invention, wherein the special code is disposed at each different number of bits from the start of the first transmission digital data block constituting a second transmission digital data block which is constituted of the plurality of successive first transmission digital data blocks. According to the sixth digital data modulator, position information can be provided on the position of the special code, thereby shortening the data length of the special code. Further, the special code can be allocated to error-correcting codes of different systems, thereby improving demodulation capability in the digital data demodulation.

According to the sixth digital data modulator, a seventh digital data modulator of the present invention, wherein the special code disposed in the second transmission digital data block specifies, according to the position of the special code, the position of the first transmission digital data block relative to the start of the second transmission digital data block and the position of the special code relative to the start of the first transmission digital data block including the special code.

According to the fifth and seventh digital data modulators of the present invention, the special code itself or the position of the special code can have position information. Therefore, even when the first transmission digital data block has an error involving a bit slip, the arrangement of the modulation code, which is identified on the basis of the data string including the special code, can be corrected according to the position of the special code (the position of the modulation code), thereby improving the demodulation capability of the transmission digital data block.

According to the first digital data modulator, an eighth digital data modulator of the present invention, wherein the number of special codes and the position of the special code can be designated from the outside. According to the eighth digital data modulator, it is possible to prevent the transmission digital data block from being irreproducible due to the presence of the special code.

According to the first digital data modulator, a ninth digital data modulator of the present invention, wherein an instruction to dispose no special code can be provided from the outside. According to the ninth digital data modulator, it is possible to prevent the transmission digital data block from being irreproducible due to the presence of the special code.

According to the first digital data modulator, a tenth digital data modulator of the present invention, wherein the modulating unit generates the modulation data block such that no maximum run length occurs between the successive modulation codes. According to the tenth digital data demodulator, the specific pattern can be readily detected when the specific pattern is the data string having the maximum run length in the first digital data demodulator.

According to the first digital data modulator, an eleventh digital data modulator of the present invention, wherein the transmission digital data generating unit places, in the modulation data block, any number of special codes on correctable positions, the number not exceeding the error-correcting capability of the error-correcting code data block generated by the error-correcting coder. According to the eleventh digital data modulator, it is possible to prevent the transmission digital data block from being irreproducible due to the presence of the special code.

According to the first digital data demodulator, a twelfth digital data demodulator of the present invention, wherein the transmission line is radiotelegraphy, wire telegraphy, or a recording medium.

According to the first to twelfth digital data modulators of the present invention, even when the first transmission digital data has an error involving a bit slip in the transmission line, it is possible to correct the detection position of the synchronous pattern by using the special code during digital data demodulation. Further, it is possible to specify the phase of the modulation code during digital data demodulation, thereby reducing a burst error caused by a bit slip in the transmission line.

A twelfth digital data demodulator of the present invention comprises: a synchronous pattern processing unit for detecting the synchronous pattern from a data string of the first transmission digital data block on a predetermined detection position when the data string of the first transmission digital data block generated by the first digital data modulator is inputted through the transmission line, a special code analyzer which detects the special code from the data string of the first transmission digital data block and analyzes the detected special code to locate the special code, a modulation code identifying unit which identifies the modulation code of the first transmission digital data block on the basis of the data string including the special code when the special code is detected by the special code analyzer, detects a phase difference between data strings of the second data length, the data strings being identified on the basis of the data string including the special code and the synchronous pattern detected by the synchronous pattern processing unit, and corrects the detection position of the synchronous pattern in the synchronous pattern processing unit according to the detected phase difference, and a demodulating unit which corrects, according to the position of the special code identified by the special code analyzer, the arrangement of the modulation code identified by the modulation code identifying unit when the special code is detected by the special code analyzer, and which performs reproduction to original digital data.

A first digital data modulator-demodulator of the present invention comprises the first digital data modulator and the twelfth digital data demodulator.

According to the twelfth digital data demodulator and the first digital data modulator-demodulator of the present invention, even when the modulation data block has an error involving a bit slip in the transmission line, it is possible to specify the position and phase of the modulation code by detecting the specific code. Further, it is possible to detect a phase difference between the currently modulated data string of the second data length and the modulation code identified by detecting the special code and correct the detection position of the synchronous pattern according to the phase difference, thereby improving the capability of demodulating digital data. Since the detection position of the synchronous pattern can be corrected by means of information other than the synchronous pattern, it is possible to make corrections at many points, thereby improving the capability of detecting asynchronous pattern.

As described above, according to the present invention, even when digital data inputted through the transmission line has an error involving a bit slip and a burst error occurs in the digital data due to the bit slip during the demodulation of the digital data, it is possible to correctly identify the modulation code by detecting the specific pattern or the special code, thereby eliminating the burst error before the subsequent synchronous pattern is detected.

Moreover, when the specific pattern or the special code is detected, a phase difference is detected between the currently demodulated data string of the second data length and the modulation code identified by detecting the specific pattern or the special code, and the detection position of the synchronous pattern can be corrected according to the phase difference.

Therefore, according to the present invention, it is possible to reduce a loss of digital data due to a burst error and improve the capability of detecting a synchronous pattern, thereby improving demodulation capability.

Further, during digital data modulation, when a merge bit string is inserted between successive modulation codes, the occurrence of a specific pattern is prevented on the merge of the successive two modulation codes, so that it is possible to generate digital data for reducing the probability of erroneous detection of a specific pattern during digital data demodulation.

Furthermore, a data string not present in the modulation code or a combination of the modulation codes is placed as the special code in digital data, and information on the correction of the arrangement of the modulation code during error correction is embedded in the special code itself or on a position where the special code is disposed, thereby generating digital data advantageous to demodulation on digital data having a burst error.

DESCRIPTION OF THE EMBODIMENTS

The following will discuss embodiments of the present invention. In the embodiments, a CD is defined as a transmission line. The transmission line is not limited to a CD and other recording media (e.g., a DVD) are similarly applicable. Further, the transmission line is not limited to recording media. Radiotelegraphy and wire telegraphy are similarly applicable.

Embodiment 1

Figure 1:
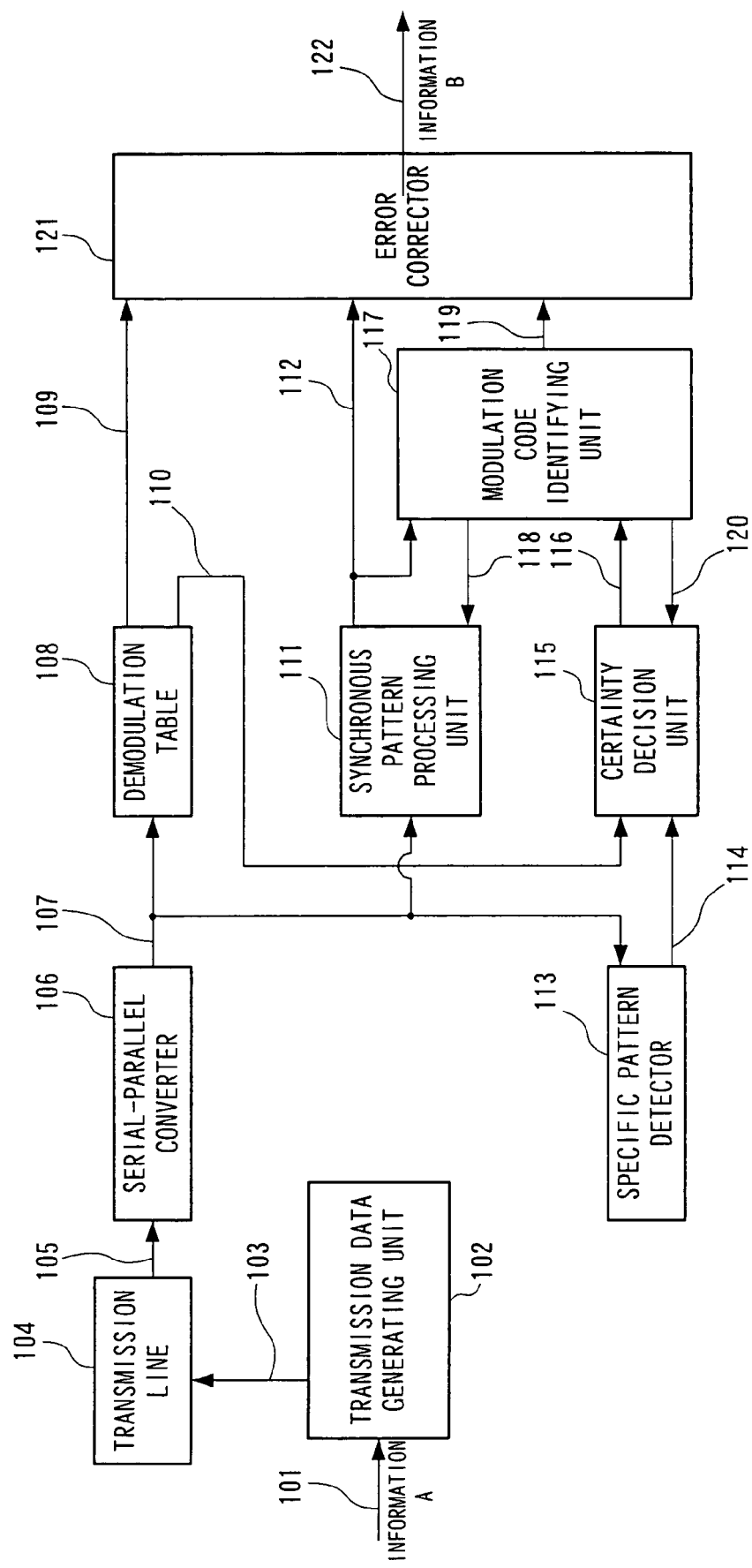
FIG. 1 is a block diagram showing a digital data modulator-demodulator according to Embodiment 1 of the present invention.
Figure 2:
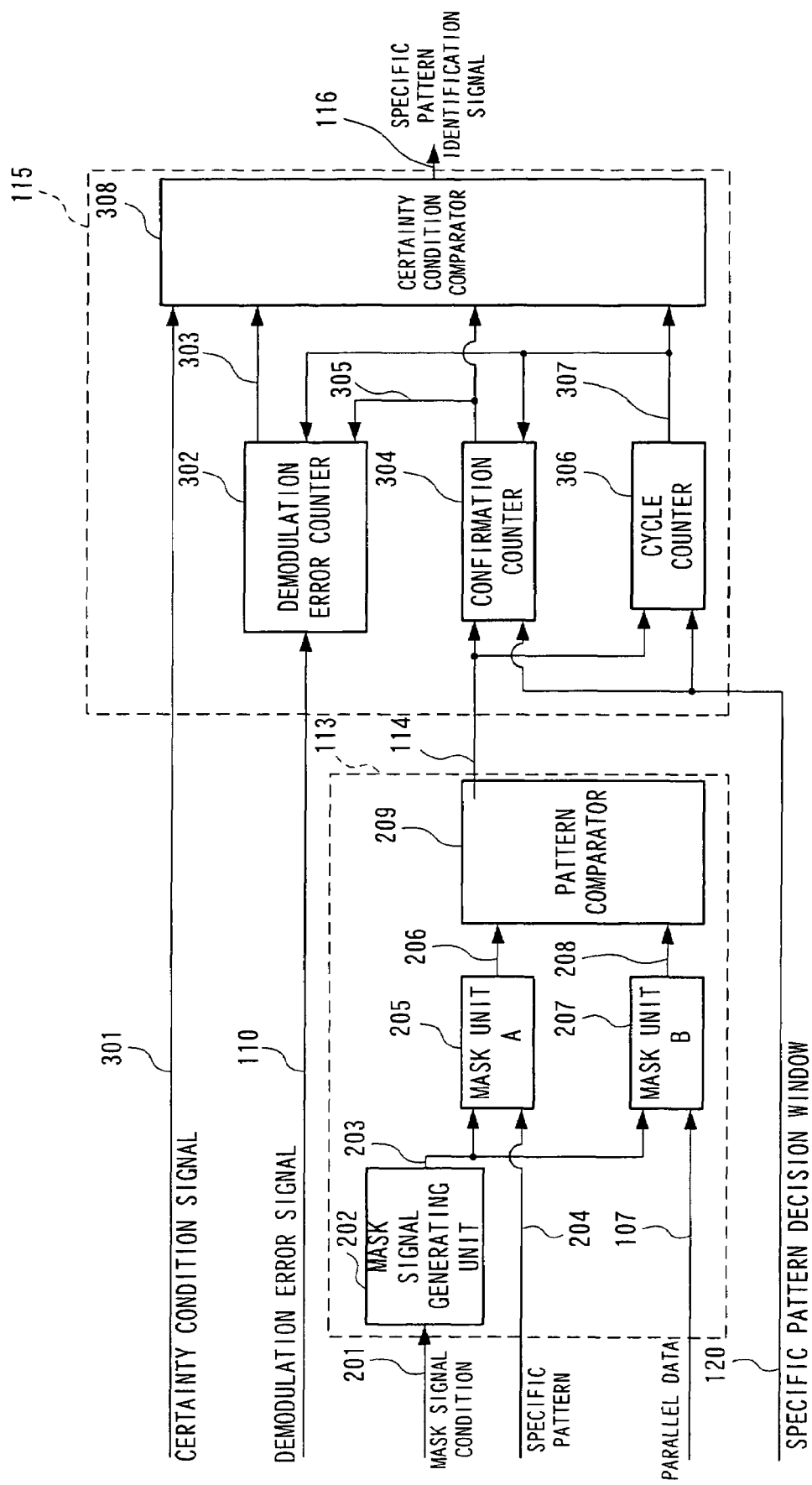
FIG. 2 is a block diagram showing details of a specific pattern detector and a certainty deciding unit of the digital data modulator-demodulator according to Embodiment 1 of the present invention.
Figure 3:
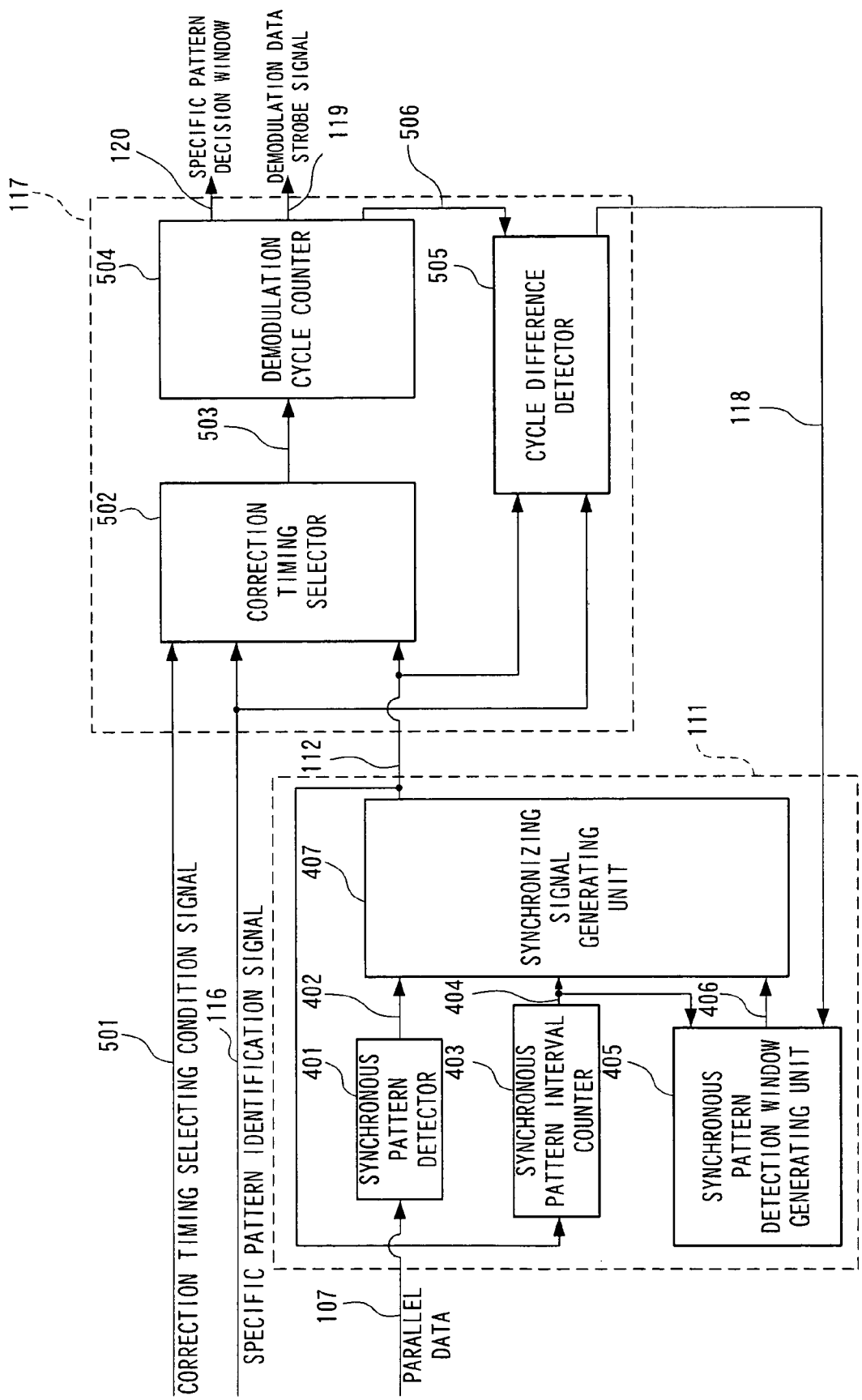
FIG. 3 is a block diagram showing details of a synchronous pattern processing unit and a modulation code identifying unit of the digital data modulator-demodulator according to Embodiment 1 of the present invention.

Referring to FIGS. 1 to 3, the following will discuss a digital data modulator-demodulator of Embodiment 1. FIG. 1 shows the digital data modulator-demodulator of Embodiment 1.

In FIG. 1, a transmission data generating unit 102 adds an error-correcting code to information A101 to be recorded on a CD. Then, the transmission data generating unit 102 performs EFM modulation on the information to generate a transmitted digital data output signal (the data string of a modulation data block) 103.

A transmission line 104 controls the intensity of a laser beam based on the transmission digital data output signal 103 and records the signal on the CD. Further, the transmission line 104 carries the recorded CD to a CD player. The transmission line 104 reads the intensity of light reflected by the irradiation of a laser beam on the carried CD, so that a transmission digital data input signal 105 is generated.

A serial-parallel converter 106 stores the inputted transmission digital data input signal 105 in a shift register to generate parallel data 107.

A demodulation table 108 demodulates EFM modulation data (modulation code) included in the parallel data 107 to generate demodulation data 109 and a demodulation error signal 110.

A synchronous pattern processing unit 111 detects a synchronous pattern included in the parallel data 107 while using a cycle difference detection signal (phase difference detection signal) 118 generated by a modulation code identifying unit 117, so that a synchronizing signal 112 is generated.

A specific pattern detector 113 detects a specific pattern included in the parallel data 107 and generates a specific pattern detection signal 114.

A certainty decision unit 115 decides the certainty (reliability) of the specific pattern detection signal 114 by using a specific pattern decision window 120 generated in the modulation code identifying unit 117 and the demodulation error signal 110 generated in the demodulation table 108, and generates a specific pattern identification signal 116.

The modulation code identifying unit 117 generates, by using the synchronizing signal 112 and the specific pattern identification signal 116, the cycle difference detection signal 118 for controlling the synchronous pattern processing unit 111, a demodulation data strobe signal 119 for identifying the demodulation data 109 generated in the demodulation table 108, and the specific pattern decision window 120 indicating a decision interval of a specific pattern.

An error corrector 121 calculates the demodulation data 109 for each of the demodulation data strobe signals 119 based on the synchronizing signal 112, so that an error pattern and an error position are determined. Then, the error corrector 121 corrects the demodulation data 109 based on the error pattern and the error position, so that information B122 is generated which is equivalent to the information A101.

In this digital data modulator-demodulator, the generation of demodulation data in the demodulation table 108 and the error correction in the error corrector 121 correspond to demodulation. Error correction is performed for each of the demodulation data strobe signals 119 based on the synchronizing signal 112, so that inputted data strings are reproduced to original digital data.

FIG. 2 shows the detail of the specific pattern detector 113 and the certainty decision unit 115.

In FIG. 2, a mask signal generating unit 202 converts a mask signal condition 201 into a mask signal 203.

A mask unit A205 masks a specific pattern 204 according to the mask signal 203 to generate a specific pattern mask signal 206.

A mask unit B207 masks the parallel data 107 according to the mask signal 203 to generate a parallel data mask signal 208.

A pattern comparator 209 confirms a match between the specific pattern mask signal 206 and the parallel data mask signal 208 to generate the specific pattern detection signal 114.

A demodulation error counter 302 counts the demodulation error signal 110 by using a demodulation error count enable signal 305 generated in a confirmation counter 304 and a confirmation strobe signal 307 generated in a cycle counter 306, and the demodulation error counter 302 generates a demodulation error number signal 303.

The confirmation counter 304 generates the demodulation error count enable signal 305 by using the specific pattern detection signal 114, the specific pattern decision window 120, and the confirmation strobe signal 307.

The cycle counter 306 generates the confirmation strobe signal 307 by using the specific pattern detection signal 114 and the specific pattern decision window 120.

A certainty condition comparator 308 generates the specific pattern identification signal 116 by using a certainty condition signal 301, the demodulation error number signal 303, the demodulation error count enable signal 305, and the confirmation strobe signal 307.

FIG. 3 shows the detail of the synchronous pattern processing unit 111 and the modulation code identifying unit 117.

In FIG. 3, a synchronous pattern detector 401 detects a synchronous pattern included in the parallel data 107 and generates a synchronous pattern detection signal 402.

A synchronous pattern interval counter 403 measures a synchronous pattern interval by using the synchronizing signal 112 and generates a synchronous pattern interval value 404.

A synchronous pattern detection window generating unit 405 generates a synchronous pattern detection window 406 by using the synchronous pattern interval value 404 and the cycle difference detection signal 118 generated in a cycle difference detector 505.

A synchronizing signal generating unit 407 generates the synchronizing signal 112 by using the synchronous pattern detection signal 402, the synchronous pattern interval value 404, and the synchronous pattern detection window 406.

A correction timing selector 502 selects the specific pattern identification signal 116 and the synchronizing signal 112 according to a correction timing selecting condition signal 501 and generates a correction timing signal 503.

A demodulation cycle counter 504 measures a demodulation cycle by using the correction timing signal 503 and generates the demodulation data strobe signal 119, the specific pattern decision window 120, and a demodulation cycle counter value 506.

The cycle difference detector 505 generates the cycle difference detection signal 118 by using the synchronizing signal 112, the specific pattern identification signal 116, and the demodulation cycle counter value 506.

The following will discuss the operations of the digital data modulator-demodulator configured thus.

The information A101 is digital data to be recorded on the CD. The information A101 is converted into a data format for recording on the CD by the transmission data generating unit 102.

The transmission data generating unit 102 performs error-correcting coding on the information A101 according to Cross Interleave Read-Solomon Code (CIRC), so that an error-correcting code of 8 bytes is added to 24-byte information to constitute a first data block of 32 bytes.

After forming the first data block, the transmission data generating unit 102 adds, to the front of the first data block, sub code information (1 byte) including the attribute information of the information A101 and information about recording positions on the CD, so that a second data block of 33 bytes is formed.

After forming the second data block, the transmission data generating unit 102 places a synchronous pattern of 24 channel bits at the front of the second data block, converts each byte of the second data block into modulation data of 14 channel bits, and performs EFM modulation to place a merge bit of 3 channel bits for reducing DC components and low frequencies, so that a data block called a frame of 588 channel bits is formed (modulation data block).

After forming the frame, the transmission data generating unit 102 generates the transmission digital data output signal 103 by performing NRZi conversion on a bit string constituting the frame, and supplies the signal to the transmission line 104.

In this way, the transmission data generating unit 102 converts each byte (first data length) of digital data into a modulation code of 17 channel bits (second data length) and places a synchronous pattern at the front of each of the 33 (predetermined number) modulation codes, so that the frame (modulation data block) is generated.

The transmission line 104 converts the transmission digital data output signal 103 into a pit length, forms the pit on a recording track of the CD by using a stamper for a read-only CD or laser light for a recordable CD, and records the transmission digital data output signal 103 on the CD.

The transmission line 104 also includes an operation of carrying the CD, on which the transmission digital data output signal 103 is recorded, until the CD is inserted into the CD player.

Further, the transmission line 104 reads the pit formed on the CD by means of light reflected from the CD irradiated with laser light in the CD player, and the transmission line 104 generates the transmission digital data input signal 105.

When no error occurs on the transmission line 104, the transmission digital data output signal 103 and the transmission digital data input signal 105 are equivalent to each other.

However, the transmission line 104 may have an error of bit formation due to a recording condition during recording of information on the CD, an error such as a scratch during the carrying operation of the CD, and a reading error of reflected light due to a reproducing condition during reading of information on the CD. Thus, the transmission digital data output signal 103 and the transmission digital data input signal 105 are not always equivalent to each other.

The transmission line 104 supplies the transmission digital data input signal 105 to the serial-parallel converter 106.

The serial-parallel converter 106 captures, into a 24-bit shift register, the transmission digital data input signal 105 inputted for each channel bit while performing NRZ conversion, and the serial-parallel converter 106 outputs the parallel data 107 of 24 bits.

Therefore, the parallel data 107 is changed every time the transmission digital data input signal 105 is inputted, that is, for each channel bit.

The serial-parallel converter 106 supplies the parallel data 107 to the demodulation table 108, the synchronous pattern processing unit 111, and the specific pattern detector 113.

The demodulation table 108 checks the lower 14 channel bits of the 24-bit parallel data 107 against a table (describing modulation data), replaces the channel bits with a 1-byte data string corresponding to the modulation data, and supplies the 1-byte data string as the demodulation data 109 to the error corrector 121.

When no corresponding modulation data is found as a result of checking the lower 14 channel bits of the 24-bit parallel data 107 against the table, the demodulation table 108 sets the signal level of the demodulation error signal 110 to "H" and notifies the certainty decision unit 115 of the result.

In this case, when the transmission line 104 has no error, the modulation data (modulation code) is equivalent to modulation data (modulation code) generated by the EFM modulation of the transmission data generating unit 102.

When the transmission line 104 has no error, the 1-byte data string corresponding to the modulation data is equivalent to 1-byte data having been obtained before the EFM modulation of the transmission data generating unit 102.

The 24-bit parallel data 107 is supplied to the specific pattern detector 113. As shown in FIG. 2, the specific pattern detector 113 is constituted of the mask signal generating unit 202, the mask unit A205, the mask unit B207, and the pattern comparator 209.

The mask signal generating unit 202 interprets the mask signal condition 201 designated by an external control unit such as a control microcomputer and generates the mask signal 203 with a width of 14 bits.

The mask signal 203 indicates a bit to be masked, as "L" level. For example, when bit 13, bit 12, . . . , bit 1, and bit 0 are designated from the highest bit to the lowest bit of the mask signal 203 and the bit 1 and the bit 0 are masked, the mask signal 203 is represented as "11111111111100."

The mask signal generating unit 202 supplies the mask signal 203 to the mask unit A205 and the mask unit B207.

The mask unit A205 ANDs the mask signal 203 and the 14-bit specific pattern 204 which is arbitrarily designated by the external control unit such as a control microcomputer, generates the specific pattern mask signal 206, and supplies the signal to the pattern comparator 209.

In this case, the specific pattern 204 is a bit string having the maximum run length in the modulation code or a combination of the modulation codes. In a modulation scheme based on RLL, the larger run length, the smaller number of modulation codes including the run length. Therefore, the specific pattern 204 is arranged in a smaller area and can be specified with ease. It is also possible to reduce the probability of erroneous detection of the specific pattern 204.

The mask unit B207 ANDs the mask signal 203 and the lower 14 bits of the parallel data 107 which is supplied from the serial-parallel converter 106, generates the parallel data mask signal 208, and supplies the signal to the pattern comparator 209.

When a match is found between the specific pattern mask signal 206 and the parallel data mask signal 208, the pattern comparator 209 sets the signal level of the specific pattern detection signal 114 to "H" and supplies the signal to the certainty decision unit 115.

As described above, the specific pattern detector 113 enables the external control unit to arbitrarily designate a specific pattern, so that a specific pattern can be designated according to the characteristic of the modulation data block.

Further, any data string (bit string) can be designated as the mask signal 203 by the external control unit, so that any data string included in a specific pattern can be designated according to the characteristic of the modulation data block.

Moreover, any data string (bit string) can be designated as the mask signal 203 by the external control unit, so that it is possible to select a data string of any data length in the parallel data 107.

Therefore, the specific pattern mask signal 206 and the parallel data mask signal 208 are compared with each other by the pattern comparator 209, so that it is possible to detect a specific pattern of any bit string and any bit length in the parallel data 107.

The demodulation error signal 110, the specific pattern detection signal 114, and the specific pattern decision window 120 are inputted to the certainty decision unit 115. As shown in FIG. 2, the certainty decision unit 115 is constituted of the demodulation error counter 302, the confirmation counter 304, the cycle counter 306, and the certainty condition comparator 308.

The cycle counter 306 increments by one every time 1 channel bit is inputted to the serial-parallel converter 106. The cycle counter 306 resets a counter value to "0" when the signal level of the specific pattern detection signal 114 supplied from the specific pattern detector 113 is "H" and the signal level of the specific pattern decision window 120 is "H". Thereafter, the cycle counter 306 initializes the counter value to "0" every time the counter value exceeds "16". Further, the cycle counter 306 generates the confirmation strobe signal 307 every time the counter value exceeds "16", and the cycle counter 306 outputs the signal to the demodulation error counter 302, the confirmation counter 304, and the certainty condition comparator 308.

The specific pattern decision window 120 is a signal supplied from the modulation code identifying unit 117. The signal level of the specific pattern decision window 120 is "H" with a width of 4 channel bits around the demodulation data strobe signal 119 which is currently used for demodulation. The specific pattern decision window 120 removes the less reliable specific pattern detection signal 114.

The specific pattern detection signal 114, the specific pattern decision window 120, and the confirmation strobe signal 307 are supplied to the confirmation counter 304. When the signal level of the specific pattern detection signal 114 is "H" and the signal level of the specific pattern decision window 120 is "H", the confirmation counter 304 resets the counter value to "0". The confirmation counter 304 increments by one for each of the confirmation strobe signals 307 until the counter value is equal to the number of times of confirmation. The number of times of confirmation is designated by the external control unit such as a control microcomputer. When the counter value is not larger than the number of times of confirmation, the confirmation counter 304 sets the signal level of the demodulation error count enable signal 305 to "H" and supplies the signal to the demodulation error counter 302 and the certainty condition comparator 308.

The demodulation error signal 110, the confirmation strobe signal 307, and the demodulation error count enable signal 305 are supplied to the demodulation error counter 302. The demodulation error counter 302 samples the demodulation error signal 110 for each of the confirmation strobe signals 307 while the signal level of the demodulation error count enable signal 305 is "H". When the signal level of the demodulation error signal 110 is "H" with this sampling timing, the demodulation error counter 302 increments one by one. The demodulation error counter 302 supplies the counter value as the demodulation error number signal 303 to the certainty condition comparator 308.

The demodulation error number signal 303, the demodulation error count enable signal 305, and the confirmation strobe signal 307 are supplied to the certainty condition comparator 308. When the signal level of the confirmation strobe signal 307 is first set to "H" at the falling edge of the demodulation error count enable signal 305, in the case where the demodulation error number signal 303 does not exceed the certainty condition signal (a threshold value indicating the certainty of a specific pattern) 301 designated by the external control unit such as a control microcomputer, the certainty condition comparator 308 sets the signal level of the specific pattern identification signal 116 to "H" and supplies the signal to the modulation code identifying unit 117.

As described above, in the certainty decision unit 115, the cycle counter 306 generates the confirmation strobe signal 307 every time a data string of 17 channel bits (i.e., a data string equal to a data length of the modulation code) is in putted according to the specific pattern detection signal 114. Then, the confirmation counter 304 detects, by using the confirmation strobe signal 307, a predetermined number of data strings of 17 channel bits according to the data strings of 17 channel bits including the specific pattern having been detected by the specific pattern detector 113. From the data strings, the demodulation error counter 302 detects the number of data strings which cannot be demodulated. After that, the certainty condition comparator 308 compares the demodulation error number signal 303 and the certainty condition signal 301. When the demodulation error number signal 303 does not exceed the certainty condition signal (a threshold value indicating the certainty of a specific pattern) 301, the certainty condition comparator 308 ensures the reliability of the specific pattern having been detected by the specific pattern detector 113.

That is, in the case where the transmission digital data input signal 105 has an error and a phase difference is present between a phase of the data string of 17 channel bits recognized based on the synchronous pattern (synchronizing signal 112) and a phase of the data string of 17 channel bits recognized based on the specific pattern (specific pattern detection signal 114), the certainty decision unit 115 can decide reliability indicating that the data string of 17 channel bits recognized based on the specific pattern is a modulation code. Therefore, the certainty decision unit 115 makes it possible to prevent erroneous detection of a specific pattern and generate the specific pattern identification signal 116 with high reliability.

By using the specific pattern decision window 120, the certainty decision unit 115 decides only the certainty of the specific pattern detection signal 114 having been detected within a certain range around the demodulation data strobe signal 119, which is currently used for demodulation. Therefore, it is possible to eliminate an erroneously detected specific pattern and increase the accuracy of the specific pattern identification signal 116.

By inputting, as the certainty condition signal 301, the maximum number of modulation codes (e.g., the maximum number of modulation codes correctable by an error-correcting code having been added during modulation) which are included in a predetermined number (the number of times of confirmation) of modulation codes and cannot be demodulated, it is possible to increase the reliability of a detected specific pattern.

Since the certainty condition signal 301 can be arbitrarily designated from the outside, it is possible to change the degree of reliability of the detected specific pattern and optimize demodulation capability according to the state and kind of the transmission line.

The parallel data 107 and the cycle difference detection signal 118 are supplied to the synchronous pattern processing unit 111. As shown in FIG. 3, the synchronous pattern processing unit 111 is constituted of the synchronous pattern detector 401, the synchronous pattern interval counter 403, the synchronous pattern detection window generating unit 405, and the synchronizing signal generating unit 407.

The parallel data 107 is supplied to the synchronous pattern detector 401. In response to the detection of a 24-bit synchronous pattern included in the parallel data 107, the synchronous pattern detector 401 sets the signal level of the synchronous pattern detection signal 402 to "H" and supplies the signal to the synchronizing signal generating unit 407.

The synchronizing signal 112 is supplied to the synchronous pattern interval counter 403. The synchronous pattern interval counter 403 increments by one every time 1 channel bit is inputted to the serial-parallel converter 106. The synchronous pattern interval counter 403 resets a counter value to "0" when the signal level of the synchronizing signal 112 is "H" or the counter value is "587". The synchronous pattern interval counter 403 supplies the counter value as the synchronous pattern interval value 404 to the synchronous pattern detection window generating unit 405 and the synchronizing signal generating unit 407. The synchronous pattern interval counter 403 is used to identify a data block called a frame generated after EFM modulation.

The synchronous pattern interval value 404 and the cycle difference detection signal 118 are supplied to the synchronous pattern detection window generating unit 405. The synchronous pattern detection window generating unit 405 sets the signal level of the synchronous pattern detection window 406 to "H" with a width of 4 channel bits around the synchronous pattern interval value 404 of "0", and the synchronous pattern detection window generating unit 405 supplies the window to the synchronizing signal generating unit 407.

Further, according to the value of the cycle difference detection signal 118, the synchronous pattern detection window generating unit 405 makes a correction to move, in channel bits, a position where the signal level of the synchronous pattern detection window 406 is "H" (predetermined detection position of the synchronous pattern).

For example, when the cycle difference detection signal 118 has a value of "+2", the synchronous pattern detection window generating unit 405 moves backward, by 2 channel bits, the position where the signal level of the synchronous pattern detection window 406 is "H".

When the cycle difference detection signal 118 has a value of "−2", the synchronous pattern detection window generating unit 405 moves forward, by 2 channel bits, the position where the signal level of the synchronous pattern detection window 406 is "H".

The synchronous pattern detection signal 402, the synchronous pattern interval value 404, and the synchronous pattern detection window 406 are supplied to the synchronizing signal generating unit 407. When the signal level of the synchronous pattern detection window 406 is "H" and the signal level of the synchronous pattern detection signal 402 is "H", or when the signal level of the synchronous pattern detection window 406 is "H", the signal level of the synchronous pattern detection signal 402 is "L", and the synchronous pattern interval value 404 has a value of "0", the synchronizing signal generating unit 407 sets the signal level of the synchronizing signal 112 to "H" and supplies the signal to the synchronous pattern interval counter 403, the modulation code identifying unit 117, and the error corrector 121.

In this way, the synchronous pattern processing unit 111 detects a synchronous pattern from an inputted data string at the predetermined detection position, and generates the synchronizing signal 112.

The synchronous pattern processing unit 111 evaluates the synchronous pattern detection signal 402 by using the synchronous pattern detection window 406 generated by the synchronous pattern detection window generating unit 405, so that the synchronizing signal 112 can be generated with high reliability.

The synchronous pattern processing unit 111 corrects the position of the synchronous pattern detection window 406 by using the cycle difference detection signal 118, so that the synchronizing signal 112 can be increased in accuracy.

The synchronizing signal 112 and the specific pattern identification signal 116 are supplied to the modulation code identifying unit 117. As shown in FIG. 3, the modulation code identifying unit 117 is constituted of the correction timing selector 502, the demodulation cycle counter 504, and the cycle difference detector 505.

The synchronizing signal 112 and the specific pattern identification signal 116 are supplied to the correction timing selector 502. According to the correction timing selecting condition signal 501 designated by the external control unit such as a control microcomputer, the correction timing selector 502 selects the synchronizing signal 112 or the specific pattern identification signal 116 and supplies the selected signal as the correction timing signal 503 to the demodulation cycle counter 504.

Since the synchronizing signal 112 and the specific pattern identification signal 116 can be arbitrarily selected thus, it is possible to switch the timing of generating the demodulation data strobe signal 119 according to the state and kind of the transmission line.

The correction timing signal 503 is supplied to the demodulation cycle counter 504. The demodulation cycle counter 504 increments by one every time 1 channel bit is inputted to the serial-parallel converter 106. When the signal level of the correction timing signal 503 is "H" or the counter value exceeds "16", the demodulation cycle counter 504 resets the counter value to "0", sets the signal level of the demodulation data strobe signal 119 to "H", and supplies the signal to the error corrector 121. Further, the demodulation cycle counter 504 provides the cycle difference detector 505 with the demodulation cycle counter value 506 indicating a counter value.

In this way, the modulation code identifying unit 117 identifies the modulation code by using the synchronous pattern or the specific pattern, so that the demodulation data strobe signal 119 can be generated. When the certainty decision unit 115 ensures reliability, the modulation code identifying unit 117 generates the demodulation data strobe signal 119 according to a phase of the modulation code including the specific pattern. Therefore, even when a modulation data block in the transmission line has an error involving a bit slip, it is possible to specify the phase of the modulation code by detecting the specific pattern and perform error correction.

When the counter value is "13", "14", "15", "16", "0", "1", "2", "3" and "4", the demodulation cycle counter 504 sets the signal level of the specific pattern decision window 120 to "H" and supplies the window to the certainty decision unit 115.

The demodulation cycle counter 504 can arbitrarily change the range of the specific pattern decision window 120 by means of the external control unit such as a control microcomputer.

The synchronizing signal 112, the specific pattern identification signal 116, and the demodulation cycle counter value 506 are supplied to the cycle difference detector 505. The cycle difference detector 505 stores the demodulation cycle counter value 506 when the signal level of the specific pattern identification signal 116 is "H". Then, the cycle difference detector 505 decodes the stored demodulation cycle counter value 506 into any one value between "−4" and "4" to generate the cycle difference (phase difference) detection signal 118 and supplies the signal to the synchronous pattern processing unit 111.

Further, the cycle difference detector 505 resets the stored demodulation cycle counter value to "0" every time the signal level of the synchronizing signal 112 is "H".

When the demodulation cycle counter value 506 is "13", "14", "15", "16", "0", "1", "2", "3" and "4", the decoding results of "−4", "−3", "−2", "−1", "0", "+1", "+2", "+3" and "+4" are obtained in this order.

As described above, the modulation code identifying unit 117 corrects the demodulation cycle counter 504 by using the specific pattern identification signal 116 when the certainty decision unit 115 ensures reliability, thereby identifying a modulation code according to a phase of the modulation code including a specific pattern.

The modulation code identifying unit 117 detects, in the cycle difference detector 505, a phase difference (cycle difference) between a modulation code including a specific pattern with ensured reliability and a data string of 17 channel bits identified based on the synchronous pattern (synchronizing signal 112). The modulation code identifying unit 117 can correct, according to the phase difference, the position where the signal level of the synchronous pattern detection window 406 is "H" (the detection position of the synchronous pattern). Thus, it is possible to correct the detection position of the synchronous pattern every time a specific pattern is detected. Therefore, it is possible to correct the detection position of the synchronous pattern at many points, thereby improving the capability of detecting a synchronous pattern.

The demodulation data 109, the synchronizing signal 112, and the demodulation data strobe signal 119 are supplied to the error corrector 121. The error corrector 121 recognizes the front of a frame by means of the synchronizing signal 112 and samples the demodulation data 109 by means of the demodulation data strobe signal 119. Meanwhile, the error corrector 121 performs error correction according to CIRC and reproduces the information B122.

In this way, in Embodiment 1, the demodulation table (demodulator) 108 and the error corrector 121 constitute a demodulating unit. That is, when the certainty decision unit 115 ensures reliability, the demodulation data 109, in which a modulation code identified by the modulation code identifying unit 117 is demodulated, is placed in a memory space to reproduce the error-correcting code data block, and error correction is performed using an error-correcting code, so that original digital data is reproduced.

Figure 4:
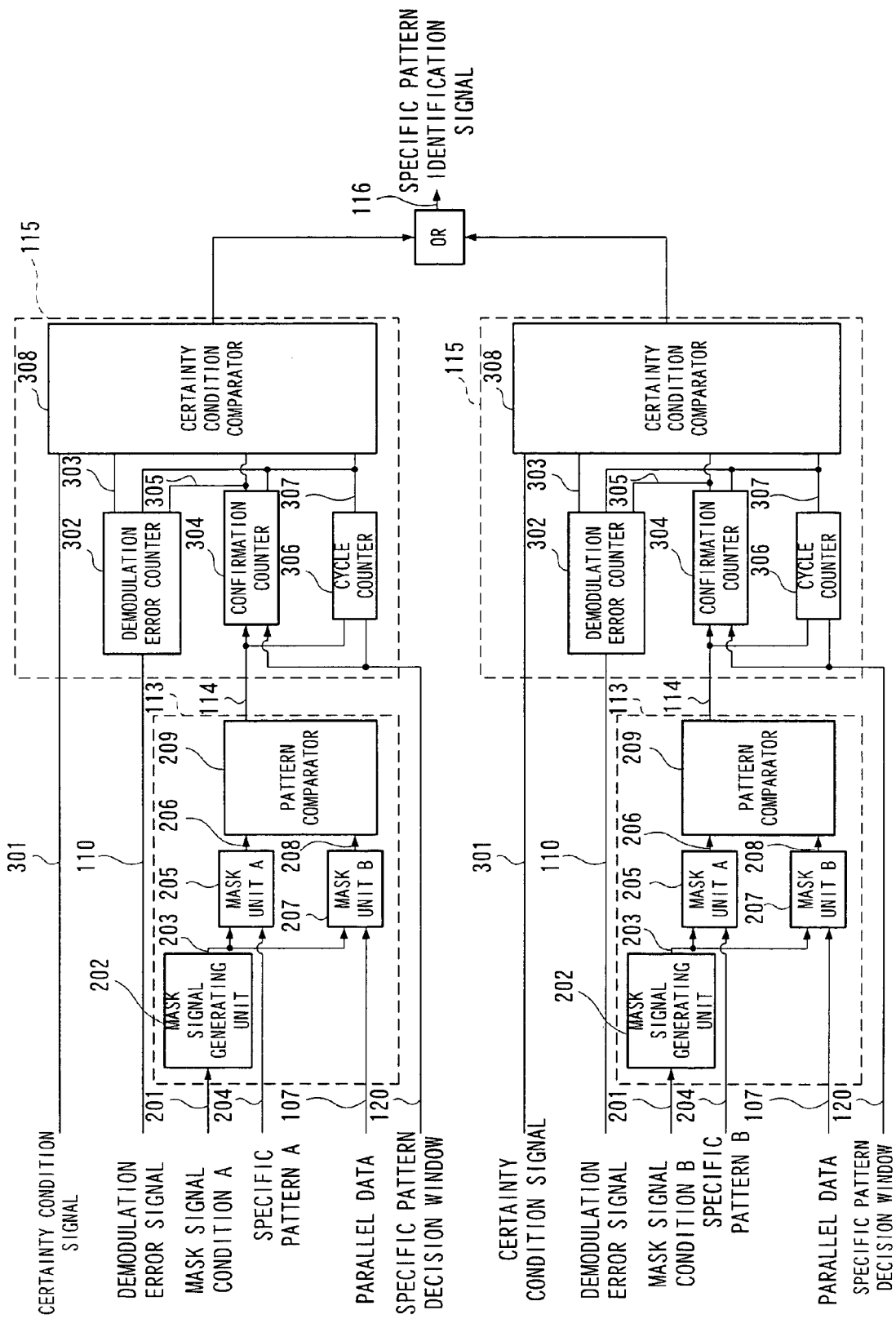
FIG. 4 is a diagram for explaining another configuration of the digital data modulator-demodulator according to Embodiment 1 of the present invention.

In Embodiment 1, the specific pattern detector 113 and the certainty decision unit 115 are configured as shown in FIG. 2 to generate the specific pattern identification signal 116. The configuration of FIG. 4 is also applicable. That is, two specific pattern detectors 113 and two certainty decision units 115 are provided, different mask signal conditions and specific patterns are designated for the detectors and units, and an OR of the outputs of the certainty condition comparators 308 is obtained as a specific pattern identification signal 116. With this arrangement, a separation of modulation data can be recognized when one of two specific patterns is detected, so that modulation data can be demodulated into demodulation data and the detection position of a synchronous pattern can be corrected more quickly. In FIG. 4, the two specific pattern detectors 113 and the two certainty decision units 115 are provided. A number of detectors and decision units may be provided to OR certainty condition comparators. It is self-evident that this configuration can increase the kinds of detectable specific patterns, demodulate modulation data into demodulation data, and correct the detection position of a synchronous pattern more quickly.

As described above, in Embodiment 1, even when a modulation code cannot be identified due to the influence of an error of the transmission line 104, it is possible to identify a modulation code from a data string other than a synchronous pattern inputted from the transmission digital data input signal 105. Therefore, according to Embodiment 1, it is possible to reduce the influence of an error of the transmission line 104 and increase the accuracy of reproducing the information B (original digital data) 122.

Further, in Embodiment 1, it is possible to correct the position of the synchronous pattern detection window 406 for predicting the position of a synchronous pattern, thereby detecting a synchronous pattern with higher accuracy.

As described in Embodiment 1, when the data length of a data string after modulation (second data length: 17 channel bits) is longer than the data length of the original data string (first data length; 1 byte), it is possible to obtain a data string which cannot be represented by the first data length in the modulation data block. Therefore, it is possible to convert digital data into a modulation code according to a modulation scheme compliant with a rule represented as RLL, and also generate a characteristic data string (specific pattern) in the modulation code satisfying the rule.

The above explanation described a CD as an example. The present embodiment is similarly applicable to other recording media (e.g., a DVD) and digital data inputted through a transmission line of radiotelegraphy, wire telegraphy, and so on.

Embodiment 2

Figure 5:
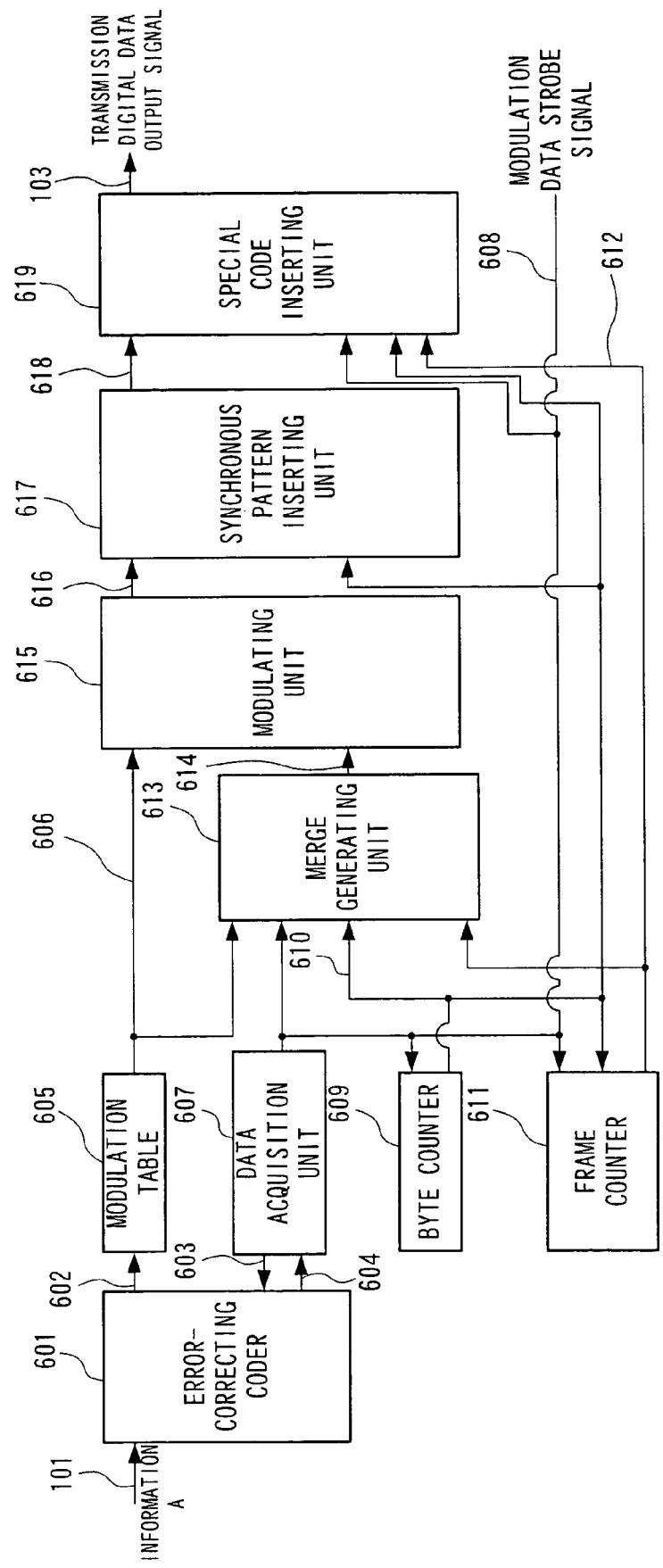
FIG. 5 is a block diagram showing modulation of a digital data modulator-demodulator according to Embodiment 2 of the present invention.
Figure 6:
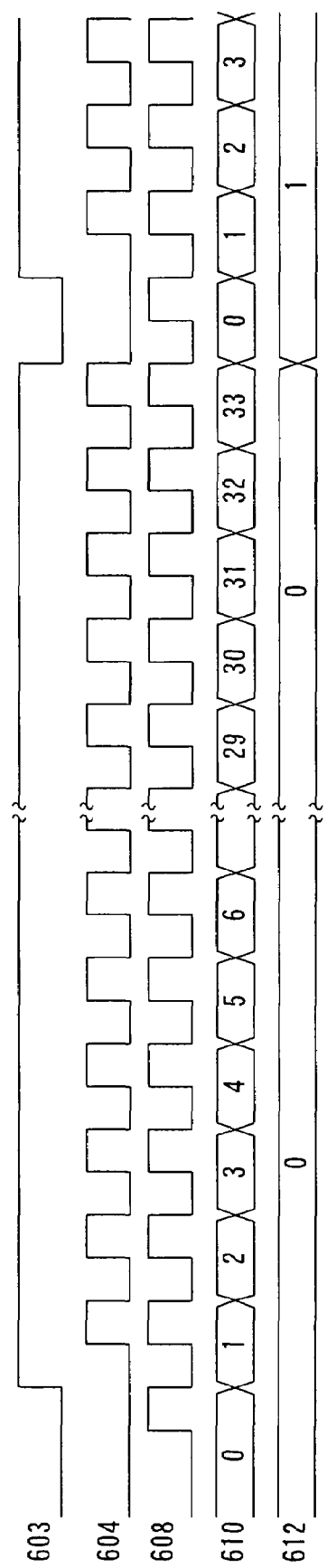
FIG. 6 is a diagram showing a timing chart of the digital data modulator-demodulator according to Embodiment 2 of the present invention.
Figure 7:
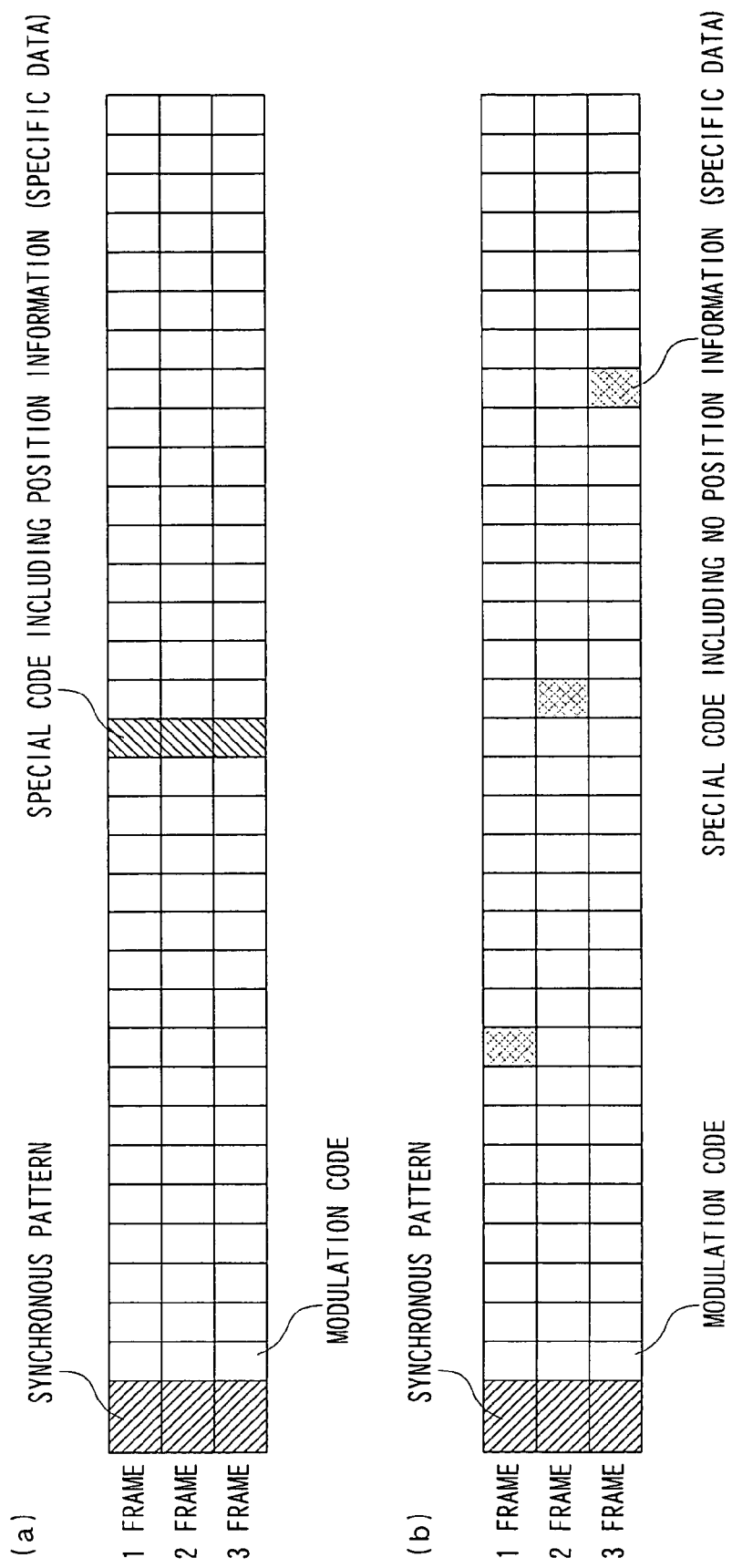
FIG. 7 is a diagram showing an example of the arrangement of specific data for the digital data modulator-demodulators according to Embodiments 2 and 3 of the present invention.

Referring to FIGS. 5 to 7, the following will discuss a digital data modulator-demodulator of Embodiment 2.

FIG. 5 is a block diagram showing modulation of the digital data modulator-demodulator according to Embodiment 2.

In FIG. 5, an error-correcting coder 601 adds an error-correcting code to information A101, which is recorded on a CD, for each predetermined capacity (in this case, 24 bytes) and generates coded data 602. Further, the error-correcting coder 601 generates a coded data strobe signal 604 for sampling the coded data 602, by using a coded data output request signal 603.

A modulation table 605 converts the coded data 602 of 1 byte into modulation data 606 of 14 channel bits.

A data acquisition unit 607 generates the coded data output request signal 603 for requesting the error-correcting coder 601 to output the coded data 602. Further, the data acquisition unit 607 generates a modulation data strobe signal 608 by using the coded data strobe signal 604.

A byte counter 609 generates a byte counter value 610 indicating the number of modulated bytes, by using the modulation data strobe signal 608.

A frame counter 611 generates a frame counter value 612 indicating the number of modulated frames, by using the modulation data strobe signal 608 and the byte counter value 610.

A merge generating unit 613 generates a merge bit string 614 by using the modulation data 606, the modulation data strobe signal 608, the frame counter value 612, and the byte counter value 610.

A modulating unit 615 generates a modulation code 616 of 17 channel bits by using the modulation data 606 and the merge bit string 614.

A synchronous pattern inserting unit 617 generates frame data 618 by using the modulation code 616 and the byte counter value 610.

In this digital data modulator-demodulator, the modulation data generation of the modulation table 605, the merge bit string generation of the merge generating unit 613, the modulation code generation of the modulating unit 615, and the synchronous pattern insertion of the synchronous pattern inserting unit 617 correspond to modulation. That is, with these processings, a synchronous pattern is added to the front of an error-correcting code data block and the error-correcting code data block is converted into a modulation code of a second data length (17 channel bits) at each first data length (14 channel bits) to generate a modulation data block (frame).

A special code inserting unit (transmission digital data generating unit) 619 replaces data in a predetermined place of the frame data 618 with a special code (described later) by using the frame data 618, the modulation data strobe signal 608, the byte counter value 610, and the frame counter value 612. The predetermined place is designated by an external control unit such as a control microcomputer. Then, the special code inserting unit 619 generates the transmission digital data output signal 103.

The following will describe the operations of the digital data modulator-demodulator configured thus. A CD will be discussed as an example.

The error-correcting coder 601 performs error-correcting coding on the information A101 according to CIRC, so that an error-correcting code of 8 bytes is added to the information of 24 bytes (predetermined capacity) to form a first data block of 32 bytes.

After the first data block is formed, the error-correcting coder 601 adds, to the front of the first data block, sub code information (1 byte) including the attribute information of the information A101 and information about recording positions on the CD, so that a second data block (error-correcting code data block) of 33 bytes is formed.

The error-correcting coder 601 outputs the second data block in bytes (outputs the coded data 602) in response to the request of the coded data output request signal 603 which is generated by the data acquisition unit 607, and the error-correcting coder 601 sets the signal level of the coded data strobe signal 604 to "H". The coded data strobe signal 604 is provided for sampling the coded data 602. Then, the error-correcting coder 601 supplies the coded data 602 to the modulation table 605 and supplies the coded data strobe signal 604 to the data acquisition unit 607.

The modulation table 605 is a decoder which converts the coded data 602 of 1 byte into modulation data of 14 channel bits. The modulation table 605 supplies the modulation data 606 to the merge generating unit 613 and the modulating unit 615.

When receiving an instruction to start modulation from the external control unit such as a control microcomputer, the data acquisition unit 607 sets the signal level of the coded data output request signal 603 to "H" and supplies the signal to the error-correcting coder 601 in order to obtain data to be modulated.

Further, when the coded data strobe signal 604 is supplied, the data acquisition unit 607 generates the modulation data strobe signal 608 of 34 bytes which are obtained by adding an inserted synchronous pattern to the continuous coded data strobe signal 604 of 33 bytes, and the data acquisition unit 607 supplies the signal to the byte counter 609, the frame counter 611, the merge generating unit 613, and the special code inserting unit 619.

The modulation data strobe signal 608 is supplied to the byte counter 609. The byte counter 609 increments by one for each of the modulation data strobe signals 608, and resets the value of the byte counter 609 to "0" at the start of modulation. Further, the byte counter 609 resets the counter value to "0" when the counter value is "33" and the signal level of the modulation data strobe signal 608 is "H", that is, when the counter value exceeds "33". Thus, the byte counter 609 generates the byte counter value 610 indicating how manieth byte from the front of the frame includes the currently modulated coded data 602. The byte counter 609 supplies the byte counter value 610 to the frame counter 611, the merge generating unit 613, the synchronous pattern inserting unit 617, and the special code inserting unit 619.

The modulation data strobe signal 608 and the byte counter value 610 are supplied to the frame counter 611. The frame counter 611 resets a counter value to "0" at the start of modulation and increments the counter value by one when the signal level of the modulation data strobe signal 608 is "H" in a state in which the byte counter value 610 is "33". The frame counter 611 resets the counter value to "0" when the counter value is equal to the number of frames designated by the external control unit such as a control microcomputer, the byte counter value 610 is "33", and the signal level of the modulation data strobe signal 608 is "H". When the number of frames designated by the external control unit such as a control microcomputer is the special code block (second transmission digital data block), the frame counter 611 generates the frame counter value 612 indicating how manieth frame of the special code block includes the currently modulated frame. The frame counter 611 supplies the frame counter value 612 to the merge generating unit 613 and the special code inserting unit 619.

FIG. 6 is a timing chart showing the relationship between the coded data output request signal 603, the coded data strobe signal 604, the modulation data strobe signal 608, the byte counter value 610, and the frame counter value 612.

As shown in FIG. 6, when the byte counter value 610 is "0", a synchronous pattern has to be inserted and thus the data acquisition unit 607 does not generate the coded data output request signal 603 but generates the modulation data strobe signal 608 with reference to the byte counter value 610.

As shown in FIG. 6, when the byte counter value 610 is between "1" and "33", the coded data 602 has to be modulated and thus the data acquisition unit 607 sets the signal level of the coded data output request signal 603 to "H" and generates the modulation data strobe signal 608 with reference to the coded data strobe signal 604.

Further, as shown in FIG. 6, the byte counter value 610 increments by one every time the signal level of the modulation data strobe signal 608 is "H". The byte counter value 610 is reset to "0" when the signal level of the modulation data strobe signal 608 is "H" in a state in which the byte counter value 610 is "33".

As shown in FIG. 6, the frame counter value 612 increments by one every time the signal level of the modulation data strobe signal 608 is "H" in a state in which the byte counter value 610 is "33".

The modulation data 606, the modulation data strobe signal 608, the byte counter value 610, and the frame counter value 612 are supplied to the merge generating unit 613. Every time the signal level of the modulation data strobe signal 608 is set to "H", the merge generating unit 613 calculates a digital sum value (DSV) by using the signal discussed below. That is, when the byte counter value 610 is "0", a DSV is calculated by using a synchronous pattern. When the byte counter value 610 is equal to a special code insertion byte position designated by the external control unit such as a control microcomputer and the frame counter value 612 is equal to a special code insertion frame position designated by the external control unit such as a control microcomputer, a DSV is calculated using a special code designated by the external control unit such as a control microcomputer. When the byte counter value 610 is a value other than the above values, a DSV is calculated using the modulation data 606.

Then, the merge generating unit 613 generates the merge bit string 614 of 3 channel bits, which do not cause the maximum run length between the two successive modulation data 606 and reduce an absolute value of the calculation result of a DSV, and the merge generating unit 613 supplies the merge bit string 614 to the modulating unit 615.

In this case, the special code insertion byte position designated by the external unit such as a control microcomputer, and the special code insertion frame position, and specific data including a special code are also used in the special code inserting unit 619. The special code has a bit string different from that of modulation data, which can be modulated by the modulation table 605, and a bit string constituted of combined modulation data. Further, the special code may include position information and attribute information. In this way, since the special code includes a data string which is not present in modulation data, the special code can be readily detected during demodulation.

The modulation data 606 and the merge bit string 614 are supplied to the modulating unit 615. The modulating unit 615 generates the modulation code 616 of 17 channel bits (second data length) in which the modulation data 606 of 14 channel bits (first data length) is arranged on the low-order side and the merge bit string 614 of 3 bits is arranged on the high-order side, and the modulating unit 615 supplies the modulation code 616 to the synchronous pattern inserting unit 617.

The modulation data strobe signal 608, the byte counter value 610, and the modulation code 616 are supplied to the synchronous pattern inserting unit 617. The synchronous pattern inserting unit 617 expands the modulation code 616 to the low-order side by 10 bits. When the byte counter value 610 is "0", the synchronous pattern inserting unit 617 replaces the low-order 24 bits of the expanded data string of 27 bits with a synchronous pattern to generate the frame data (modulation data block) 618 and supplies the frame data 618 to the special code inserting unit 619.

The synchronous pattern is added to the front of the second data block (error-correcting code data block) generated thus by the error-correcting coder 601. The second data block is converted into a modulation code of 17 channel bits (second data length) for each modulation data of 14 channel bits (first data length) generated by the modulation table 605, and is outputted as a frame (modulation data block).

The modulation data strobe signal 608, the byte counter value 610, the frame counter value 612, and the frame data 618 are supplied to the special code inserting unit 619. Every time the signal level of the modulation data strobe signal 608 is set to "H", the special code inserting unit 619 confirms whether the byte counter value 610 is equal to the special code insertion byte position designated by the external control unit such as a control microcomputer and whether the frame counter value 612 is equal to the special code insertion frame position designated by the external control unit such as a control microcomputer. When the position condition is satisfied, the special code inserting unit 619 replaces a data string of a specific data length on the position (specific position) of the frame data 618 with a data string (specific data) including a special code designated by the external control unit such as a control microcomputer, and the special code inserting unit 619 stores the data string. Needless to say, the specific data is a data string whose data length (bit length) is equal to the specific data length.

When the position condition is not satisfied, the special code inserting unit 619 stores the frame data 618. The special code itself may be used as specific data.

Regarding data stored when the byte counter value 610 is "0", the special code inserting unit 619 outputs all the 27-bit data sequentially in bits as the transmission digital data output signal 103 from the MSB. Regarding data stored when the byte counter value 610 has a value other than "0", the special code inserting unit 619 outputs only high-order 17 bits of the 27-bit data sequentially in bits as the transmission digital data output signal 103 from the MSB.

In this way, the special code inserting unit 619 replaces the data string, which has a specific data length on the specific position of the frame data (modulation data block) 618, with specific data including the special code. The special code inserting unit 619 generates the frame (first transmission digital data block) constituted of the 27-bit data having been stored when the byte counter value 610 is "0" and the high-order 17 bits of data having been stored when the byte counter value 610 has a value other than "0", and outputs the frame to the transmission line.

In this case, a plurality of positions for inserting special codes and a plurality of positions for inserting frames can be designated by the external control unit, so that it is possible to control the number of special codes to be inserted into the frame. The number of inserted special codes is designated within a range from "0" to a number not exceeding the correcting capability of the error-correcting code added to digital data. Further, a position enabling the error correction of the error-correcting code is designated as the position for inserting the special code. In this way, it is possible to prevent the transmission digital data output signal from being irreproducible (demodulation is impossible) due to the presence of the special code.

Further, when the special code is a data string which is equal to or longer than the data length of the modulation code, the special code does not depend on the modulation code or a combination of modulation codes, so that the special code can be readily detected during demodulation.

By permitting the external control unit to designate any bit length and a special code of any bit string, a data string not depending upon the modulation code or a combination of modulation codes can be used as the special code. When a data string equal to or longer than the data length of the modulation code is used as the special code, a data string not present in a plurality of successive modulation codes can be used as the special code. Thus, the special code can be readily detected during demodulation.

The external control unit may provide an instruction to place no special code. Thus, it is possible to prevent the transmission digital data output signal from being irreproducible (demodulation is impossible) due to the presence of the special code.

As described above, according to Embodiment 2, even in the presence of an error involving a bit slip in the transmission digital data output signal, when the special code is used as the specific pattern during demodulation in a digital data demodulator of Embodiment 1, the reproducible modulation code can be reproduced to the original digital data. Further, the detection position of the synchronous pattern can be accurately corrected using the special code. Therefore, it is possible to reduce burst errors caused by a bit slip in the transmission line.

Moreover, according to Embodiment 2, the merge generating unit 613 does not cause the maximum run length in a data string over two modulation codes. Therefore, it is possible to increase reliability in keeping track of the modulation code when a data string having the maximum run length is used as a specific pattern during demodulation in the digital data demodulator of Embodiment 1, thereby improving demodulation capability.

Also in the case of a digital data modulation scheme having no merge bit, by performing modulation such that a data string over two modulation codes does not have the maximum run length, it is possible to increase reliability in keeping track of the modulation code during demodulation of the digital data demodulator of Embodiment 1 as described above.

FIG. 7 shows an example in which specific data including special data is placed in the special code block (second transmission digital data block) constituted of a plurality of successive frames (first transmission digital data block). In the example of FIG. 7, the specific data length matches with the modulation code length.

The special code including position information is placed in the special code block of FIG. 7(*a*). By reading the special code, it is possible to decide how manieth frame it is in the special code block or how manieth modulation code from the start of each frame corresponds to the position of the specific data (special code).

In this way, the special code includes information for specifying a position relative to the start of the frame (first transmission digital data block). Thus, even when transmission digital data has an error involving a bit slip, it is possible to correctly detect the position and phase of the modulation code, thereby improving demodulation capability in the demodulator.

A special code block shown in FIG. 7(*b*) has a special code including no position information. In this case, as shown in FIG. 7(*b*), specific data (special code) is placed on different positions relative to the start of each frame. With this arrangement, position information can be provided on a position where the special code is placed. Thus, by analyzing the positional relationship between the synchronous pattern and the special code, it is possible to decide how manieth frame it is in the special code block or how manieth modulation code from the start of each frame corresponds to the position of the specific data (special code). Thus, even when transmission digital data has an error involving a bit slip, it is possible to correctly detect the position and phase of the modulation code, thereby improving demodulation capability in the demodulator.

Further, with this arrangement, position information can be provided on the position of the special code, thereby shortening the data length of the special code.

When the specific data (special code) is arranged as FIG. 7(*b*), the special code can be allocated to error-correcting codes of different systems. That is, in the arrangement method of FIG. 7(*a*), the specific data is placed on the same position from the starts of the frames, so that an error-correcting code of the same system may be replaced with the special code. In contrast, in the arrangement method of FIG. 7(*b*), the special code can be allocated to error-correcting codes of different systems, thereby improving demodulation capability (error-correcting capability) in the demodulator.

As described above, the reproduction accuracy of the information A101 can be increased by inserting the special data as shown in FIG. 7.

As with Embodiment 1, when the second data length (17 channel bits) is longer than the first data length (1 byte), it is possible to obtain a data string which cannot be represented by the first data length in the modulation data block. Therefore, it is possible to convert digital data into a modulation code according to a modulation scheme compliant with a rule represented as RLL, and also generate a characteristic data string (specific pattern) in the modulation code satisfying the rule.

When a CD is reproduced using an ordinary digital data demodulator having no special code analyzer for detecting and analyzing a special code from data read from the CD, a special code inserted by the digital data modulator is different from modulation data, resulting in an error. However, as described above, by placing the special code so as to enable error correction, it is possible to avoid an error caused by the special code. Thus, even in the case of an ordinary digital data demodulator having no special code analyzer, data having an inserted special code can be accurately reproduced by the digital data modulator.

That is, even when data having an inserted special code is recorded on a removable medium such as a CD by the digital data modulator, the data can be reproduced by a reproducing apparatus comprising an ordinary digital data demodulator.

The above explanation described a CD as an example. The present embodiment is similarly applicable to other recording media (e.g., a DVD) and digital data inputted through a transmission line of radiotelegraphy, wire telegraphy, and so on.

Embodiment 3

Figure 8:
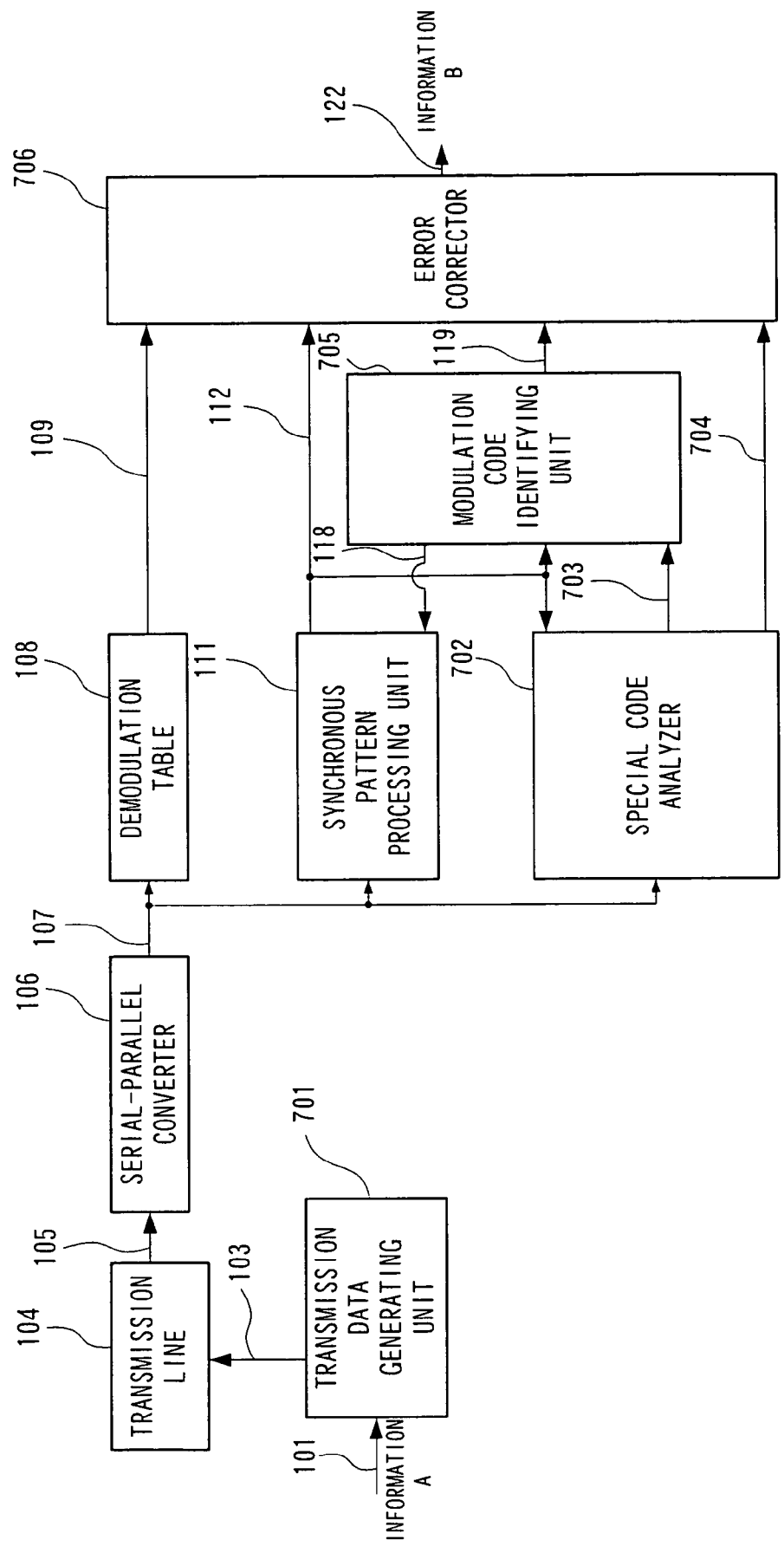
FIG. 8 is a block diagram showing a digital data modulator-demodulator according to Embodiment 3 of the present invention.
Figure 9:
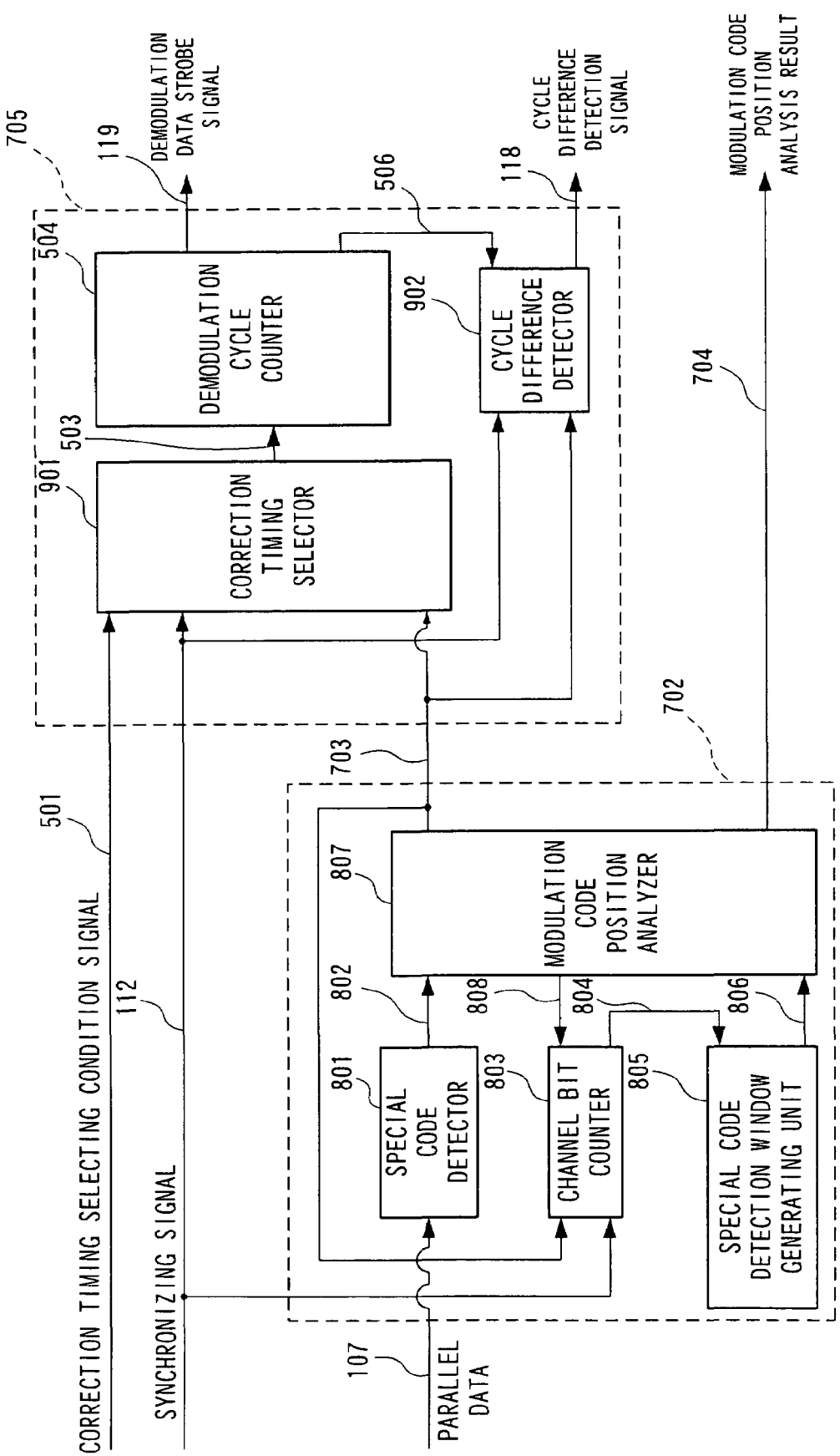
FIG. 9 is a block diagram showing details of a special code analyzer and a modulation code identifying unit of the digital data modulator-demodulator according to Embodiment 3 of the present invention.

Referring to FIGS. 8 and 9, the following will discuss a digital data modulator-demodulator of Embodiment 3.

FIG. 8 shows the digital data modulator-demodulator of Embodiment 3.

In FIG. 8, a transmission data generating unit 701 adds an error-correcting code to information A101 to be recorded on a CD, by using the digital data modulator disclosed in Embodiment 2. Thereafter, the transmission data generating unit 701 performs EFM modulation while embedding specific data including a special code, so that a transmission digital data output signal 103 is generated.

A transmission line 104 controls the intensity of laser light based on the transmission digital data output signal 103 and records the transmission digital data output signal 103 on the CD. Further, the transmission line 104 carries the recorded CD to a CD player. Moreover, the transmission line 104 reads the intensity of light reflected from the carried CD which is irradiated with laser light, so that a transmission digital data input signal 105 is generated.

A serial-parallel converter 106 stores the inputted transmission digital data input signal 105 in a shift register, so that parallel data 107 is generated.

A demodulation table 108 demodulates EFM modulation data (modulation code) included in the parallel data 107 to generate demodulation data 109.

A synchronous pattern processing unit 111 detects a synchronous pattern included in the parallel data 107 while using a cycle difference detection signal (phase difference detection signal) 118 generated by a modulation code identifying unit 705, and the synchronous pattern processing unit 111 generates a synchronizing signal 112.

A special code analyzer 702 detects a special code included in the parallel data 107, analyzes the detected special code, and generates a special code identification signal 703 and a modulation code position analysis result 704.

The modulation code identifying unit 705 generates, by using the synchronizing signal 112 and the special code identification signal 703, the cycle difference detection signal 118 for controlling the synchronous pattern processing unit 111 and a demodulation data strobe signal 119 for identifying the demodulation data 109 generated in the demodulation table 108.

An error corrector 706 calculates the demodulation data 109 for each of the demodulation data strobe signals 119 by using the synchronizing signal 112 and the modulation code position analysis result 704, so that an error pattern and an error position are determined. Then, the error corrector 706 corrects the demodulation data 109 based on the error pattern and the error position, so that information B122 is generated which is equivalent to the information A101.

FIG. 9 shows the detail of the special code analyzer 702 and the modulation code identifying unit 705.

In FIG. 9, a special code detector 801 detects a special code included in the parallel data 107 and generates a special code detection signal 802.

A channel bit counter 803 recognizes the number of channel bits in one frame by using the synchronizing signal 112, the special code identification signal 703, and a counter correction signal 808, and generates a channel bit counter value 804.

A special code detection window generating unit 805 generates, by using the channel bit counter value 804, a special code detection window 806 for analyzing the position of a specific code (special code). The special code detection window 806 can reduce erroneous detections of a special code.

A modulation code position analyzer 807 analyzes the special code detection signal 802 by using the special code detection window 806 and generates the counter correction signal 808, the special code identification signal 703, and the modulation code position analysis result 704.

Specific data including a special code may be detected in the special code detector 801.

A correction timing selector 901 selects the synchronizing signal 112 or the special code identification signal 703 according to a correction timing selecting condition signal 501 and generates a correction timing signal 503.

A demodulation cycle counter 504 measures a demodulation cycle by using the correction timing signal 503 and generates the demodulation data strobe signal 119 and a demodulation cycle counter value 506.

A cycle difference detector 902 generates the cycle difference detection signal 118 by using the synchronizing signal 112, the special code identification signal 703, and the demodulation cycle counter value 506.

The following will discuss the operations of the digital data modulator-demodulator configured thus. The transmission data generating unit 701 is equivalent to the digital data modulator of Embodiment 2, and the transmission line 104, the serial-parallel converter 106, the demodulation table 108, the synchronous pattern processing unit 111, and the demodulation cycle counter 504 are equivalent to the transmission line and the digital data demodulator of Embodiment 1. Thus, the explanation thereof is omitted and only the special code analyzer 702, the modulation code identifying unit 705, and the error corrector 706 will be discussed below.

The parallel data 107 is supplied to the special code detector 801. When a special code designated by an external control unit such as a control microcomputer is detected from the parallel data 107, the special code detector 801 sets the signal level of a detection component of the special code detection signal 802 to "H" and generates a position component of the special code detection signal 802 by analyzing a bit string of the special code. The special code detector 801 supplies the special code detection signal 802, which is composed of the detection component and the position component, to the modulation code position analyzer 807.

In this way, the special code detection signal 802 is constituted of two components of the detection component indicating the detection of a special code and the position component indicating position information included in the special code.

The synchronizing signal 112, the special code identification signal 703, and the counter correction signal 808 are supplied to the channel bit counter 803. The channel bit counter 803 increments by one every time 1 channel bit is inputted to the serial-parallel converter 106. The channel bit counter 803 resets a counter value to "0" when the signal level of the synchronizing signal 112 is "H" or the counter value is "587". In this way, the channel bit counter 803 supplies the channel bit counter value 804, which indicates the number of channel bits supplied to the special code detector 801, to the special code detection window generating unit 805 based on the synchronizing signal 112 (synchronous pattern).

When the signal level of the special code identification signal 703 is "H", the channel bit counter 803 reads a value indicated by the counter correction signal 808 and corrects the counter value.

The channel bit counter value 804 is supplied to the special code detection window generating unit 805. The special code detection window generating unit 805 sets the signal level of the special code detection window 806 to "H" with a width of 4 channel bits around a point where a value designated by the external control unit such as a control microcomputer is equal to the channel bit counter value 804, and the special code detection window generating unit 805 supplies the special code detection window 806 to the modulation code position analyzer 807.

For example, as shown in FIGS. 7(a) and 7(b), when a frame having specific data (special code) is supplied as the transmission digital data input signal 105, the signal level of the special code detection window 806 is set to "H" with a width of 4 channel bits around a point which is expected to have an embedded special code.

That is, when a frame having specific data (special code) as shown in FIG. 7(a) is supplied as the transmission digital data input signal 105, the specific data (special code) is disposed on the same position relative to the starts of the frames and thus the special code detection window generating unit 805 generates the special code detection window 806 one time for each frame. Further, when a frame having specific data (special code) as shown in FIG. 7(b) is supplied as the transmission digital data input signal 105, the specific data (special code) is disposed on three different positions relative to the starts of the frames and thus the special code detection window generating unit 805 generates the special code detection window 806 three times for each frame.

The special code detection window generating unit 805 can arbitrarily change the range of the special code detection window 806 by means of the external control unit such as a control microcomputer.

The special code detection signal 802 and the special code detection window 806 are supplied to the modulation code position analyzer 807. When the signal level of the special code detection window 806 is "H" and the signal level of a detection component of the special code detection signal 802 is "H", the modulation code position analyzer 807 sets the signal level of the special code identification signal 703 to "H" and supplies the signal to the channel bit counter 803 and the modulation code identifying unit 705.

Further, when the frame having specific data (special code) as shown in FIG. 7(a) is supplied as the transmission digital data input signal 105, the modulation code position analyzer 807 analyzes the position component of the special code detection signal 802, so that the modulation code position analyzer 807 recognizes how manieth frame it is in a special code block (frame position) or how manieth modulation code from the start of each frame (the position of the modulation code) corresponds to the position of the specific data (special data), and the modulation code position analyzer 807 generates the counter correction signal 808 and the modulation code position analysis result 704.

Moreover, when the frame having specific data (special code) as shown in FIG. 7(b) is supplied as the transmission digital data input signal 105, the modulation code position analyzer 807 analyzes how manieth special code detection window 806 has the detection component of the special code detection signal 802 with the signal level of "H" in each frame, and the modulation code position analyzer 807 identifies the frame position and the modulation code position and generates the counter correction signal 808 and the modulation code position analysis result 704.

The synchronizing signal 112 and the special code identification signal 703 are supplied to the correction timing selector 901. According to the correction timing selecting condition signal 501 designated by the external control unit such as a control microcomputer, the correction timing selector 901 selects the synchronizing signal 112 or the special code identification signal 703 and supplies the selected signal as the correction timing signal 503 to the demodulation cycle counter 504.

The synchronizing signal 112, the special code identification signal 703, and the demodulation cycle counter value 506 are supplied to the cycle difference detector 902. The cycle difference detector 902 stores the demodulation cycle counter value 506 when the signal level of the detection component of the special code identification signal 703 is "H". Then, the cycle difference detector 902 decodes the stored demodulation cycle counter value 506 into any one value between "−4" and "4" to generate the cycle difference detection signal 118 and supplies the signal to the synchronous pattern processing unit 111.

Further, the cycle difference detector 902 resets the stored demodulation cycle counter value to "0" every time the signal level of the synchronizing signal 112 is "H".

As described above, when a special code is detected by the special code analyzer 702, the modulation code identifying unit 705 identifies a modulation code based on specific data including the special code (or specific code itself). Further, a phase difference is detected between a phase of a modulation code identified based on specific data including the special code and a phase of a data string of 17 channel bits (second data length) identified based on a synchronous pattern detected by the synchronous pattern processing unit 111. A position where the signal level of a synchronous pattern detection window is set to "H" (the detection position of the synchronous pattern) is corrected according to the detected phase difference.

The demodulation data 109, the synchronizing signal 112, the demodulation data strobe signal 119, and the modulation code position analysis result 704 are supplied to the error corrector 706. The error corrector 706 recognizes the start of a frame by means of the synchronizing signal 112, samples the demodulation data 109 by means of the demodulation data strobe signal 119, and places the demodulation data 109 in a memory space. At this point, the position is corrected using the modulation code position analysis result 704. In this way, the error corrector 706 places the demodulation data 109 in the memory space, so that an error-correcting code data block is reproduced to perform error correction according to CIRC and information B (original digital data) 122 is reproduced.

As described above, according to Embodiment 3, the demodulating unit is constituted of the demodulation table 108 and the error corrector 706. That is, when the special code analyzer 702 detects a special code, the demodulation data 109, in which a modulation code identified by the modulation code identifying unit 705 is demodulated, is disposed in the memory space to reproduce the error-correcting code data block. At this point, the arrangement in the memory space is corrected according to the position of the modulation code (the position of the special code) specified by the special code analyzer 702, and the error-correcting code data block is reconstructed. Then, the error-correcting code data block is subjected to error correction and is reproduced to original digital data.

As described above, in Embodiment 3, even when a modulation code cannot be identified due to the influence of an error of the transmission line 104, it is possible to identify a modulation code by using a special code inputted from the transmission digital data input signal 105. Therefore, it is possible to reduce the influence of an error of the transmission line 104 and increase the accuracy of reproducing the information B122.

Further, in Embodiment 3, it is possible to correct the position of the synchronous pattern detection window 406 for predicting the position of a synchronous pattern, thereby detecting a synchronous pattern with higher accuracy.

As described in Embodiment 1, when the second data length (17 channel bits) is longer than the first data length (1 byte), it is possible to obtain a data string which cannot be represented by the first data length in the modulation data block. Therefore, it is possible to convert digital data into a modulation code according to a modulation scheme compliant with a rule represented as RLL, and also generate a characteristic data string (specific pattern) in the modulation code satisfying the rule.

Regarding the digital data modulator-demodulator of Embodiment 3, an example was described in which the transmission data generating unit 701 generates the transmission digital data output signal 103 by using the digital data modulator-demodulator disclosed in Embodiment 2. Even in the case of an ordinary digital data modulator having no embedded special code, it is possible to demodulate the transmission digital data output signal 103 generated by the transmitted data generating unit 701.

That is, even when data is recorded on a removable medium such as a CD by the ordinary digital data modulator, a CD can be reproduced by the digital data demodulator of Embodiment 3.

The above explanation described a CD as an example. The present embodiment is similarly applicable to other recording media (e.g., a DVD) and digital data inputted through a transmission line of radiotelegraphy, wire telegraphy, and so on.

What is claimed is:

1. A digital data demodulator comprising:
a synchronous pattern processing unit for receiving a modulation data block and for detecting a synchronous pattern in the modulation data block at a predetermined detection position, the modulation data block comprising the synchronous pattern and a predetermined number of modulation codes the synchronous pattern being located at a front of the predetermined number of modulation codes, and the modulation codes being converted from original digital data;
a specific pattern detector for detecting a specific pattern in the modulation data block;
a certainty decision unit for determining whether data including the specific pattern is the modulation code when a phase difference is present between a first plurality of data identified on a basis of the specific pattern detected by the specific pattern detector and a second plurality of data identified on a basis of the synchronous pattern detected by the synchronous pattern processing unit;

a modulation code identifying unit for identifying the first plurality of data as the modulation codes on a basis of the modulation code including the specific pattern, detecting the phase difference, and correcting the detection position of the synchronous pattern in the synchronous pattern processing unit according to the phase difference when the certainty decision unit decides that the data including the specific pattern is the modulation code; and a demodulating unit for reproducing, to the original digital data, the modulation codes identified by the modulation code identifying unit when the certainty decision unit decides that the data including the specific pattern is the modulation code, wherein the certainty decision unit detects a predetermined number of data, the predetermined number of data being identified on a basis of the data including the specific pattern detected by the specific pattern detector, and the certainty decision unit counts a number of undecodable data from the predetermined number of data and decides that the data including the specific pattern detected by the specific pattern detector is the modulation code when the counted number is not larger than a threshold value indicating certainty of the specific pattern.

2. The digital data demodulator according to claim 1, wherein the threshold value indicating certainty is a maximum number value of undecodable modulation codes allowed to be included in the predetermined number of modulation codes.

3. The digital data demodulator according to claim 1, wherein the threshold value indicating certainty can be arbitrarily designated from a source outside the digital data demodulator.

4. The digital data demodulator according to claim 1, wherein the synchronous pattern processing unit receives the modulation data block from one of radiotelegraphy, wire telegraphy, and a recording medium.

5. The digital data demodulator according to claim 1, wherein the demodulating unit corrects an error of the reconverted modulation code by using an error-correcting code added to the original digital data beforehand.

6. A digital data demodulator comprising:
a synchronous pattern processing unit for receiving a modulation data block and for detecting a synchronous pattern in the modulation data block at a predetermined detection position, the modulation data block comprising the synchronous pattern and a predetermined number of modulation codes the synchronous pattern being located at a front of the predetermined number of modulation codes, and the modulation codes being converted from original digital data;

a specific pattern detector for detecting a specific pattern in the modulation data block;

a certainty decision unit for determining whether data including the specific pattern is the modulation code when a phase difference is present between a first plurality of data identified on a basis of the specific pattern detected by the specific pattern detector and a second plurality of data identified on a basis of the synchronous pattern detected by the synchronous pattern processing unit;

a modulation code identifying unit for identifying the first plurality of data as the modulation codes on a basis of the modulation code including the specific pattern, detecting the phase difference, and correcting the detection position of the synchronous pattern in the synchronous pattern processing unit according to the phase difference when the certainty decision unit decides that the data including the specific pattern is the modulation code; and a demodulating unit for reproducing, to the original digital data, the modulation codes identified by the modulation code identifying unit when the certainty decision unit decides that the data including the specific pattern is the modulation code, wherein the specific pattern detector comprises a pattern comparator for comparing a bit string of the modulation data block and a bit string of the specific pattern, and when the pattern comparator detects data matching with the bit string of the specific pattern in the bit string of the modulation data block, a signal indicating detection of the specific pattern is outputted to the certainty decision unit.

7. The digital data demodulator according to claim 6, wherein the specific pattern is a bit string having a maximum run length in the modulation code or a combination of the modulation codes.

8. The digital data demodulator according to claim 6, wherein any data is configured to be externally designated as the specific pattern from the modulation code or a combination of the modulation codes.

9. The digital data demodulator according to clam 6, wherein the specific pattern has a bit length configured to be arbitrarily designated from a source outside the digital data demodulator.

10. The digital data demodulator according to claim 6, wherein the synchronous pattern processing unit receives the modulation data block from one of radiotelegraphy, wire telegraphy, and a recording medium.

* * * * *